(12) United States Patent
Yan et al.

(10) Patent No.: US 9,346,913 B2
(45) Date of Patent: May 24, 2016

(54) METHODS OF PREPARING MONODISPERSED POLYDOPAMINE NANO- OR MICROSPHERES, AND METHODS OF PREPARING NANO- OR MICROSTRUCTURES BASED ON THE POLYDOPAMINE NANO- OR MICROSPHERES

(71) Applicant: Nanyang Technological University, Singapore (SG)

(72) Inventors: Jian Yan, Singapore (SG); Liping Yang, Singapore (SG); Xuehong Lu, Singapore (SG); Pooi See Lee, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 46 days.

(21) Appl. No.: 14/370,640

(22) PCT Filed: Jan. 4, 2013

(86) PCT No.: PCT/SG2013/000005
§ 371 (c)(1),
(2) Date: Jul. 3, 2014

(87) PCT Pub. No.: WO2013/103322
PCT Pub. Date: Jul. 11, 2013

(65) Prior Publication Data
US 2014/0336040 A1  Nov. 13, 2014

Related U.S. Application Data

(60) Provisional application No. 61/583,365, filed on Jan. 5, 2012.

(51) Int. Cl.
| B01J 31/06 | (2006.01) |
| B05D 1/18 | (2006.01) |
| C04B 35/622 | (2006.01) |
| C01B 31/02 | (2006.01) |
| C08G 61/12 | (2006.01) |
| C08G 73/06 | (2006.01) |
| C08L 79/04 | (2006.01) |
| B01J 13/02 | (2006.01) |
| B01J 20/32 | (2006.01) |
| B22F 1/00 | (2006.01) |
| H01G 4/008 | (2006.01) |
| H01G 11/36 | (2013.01) |
| B82Y 30/00 | (2011.01) |

(52) U.S. Cl.
CPC ............... *C08G 61/124* (2013.01); *B01J 13/02* (2013.01); *B01J 20/3295* (2013.01); *B01J 31/06* (2013.01); *B05D 1/18* (2013.01); *B22F 1/0051* (2013.01); *C01B 31/02* (2013.01); *C01B 31/0293* (2013.01); *C04B 35/622* (2013.01); *C08G 73/0688* (2013.01); *C08L 79/04* (2013.01); *H01G 4/008* (2013.01); *H01G 11/36* (2013.01); *B82Y 30/00* (2013.01); *C08G 2261/3241* (2013.01); *C08G 2261/79* (2013.01)

(58) Field of Classification Search
None
See application file for complete search history.

(56) References Cited

U.S. PATENT DOCUMENTS

| 4,049,604 A | 9/1977 | Morehouse, Jr. et al. |
| 4,301,264 A | 11/1981 | Moore et al. |
| 6,440,646 B2 | 8/2002 | Ueda et al. |
| 7,875,662 B2 | 1/2011 | Kim et al. |
| 2010/0330025 A1 | 12/2010 | Messersmith et al. |

OTHER PUBLICATIONS

Bao et al., "One-Pot Colloidal Synthesis of Plasmonic Patchy Particles," *Adv. Mater.* 23:2644-2649, 2011.
Cassagneau et al., "Contiguous Silver Nanoparticle Coatings on Dielectric Spheres," *Adv. Mater.* 14(10):732-736, 2002.
Chu et al., "Large enhancement in polarization response and energy density of poly(vinylidene fluoride-trifluoroethylene-chlorofluoroethylene) by interface effect in nanocomposites," *Applied Physics Letters* 91:122909, 2007, 4 pages.
Cui et al., "Monodisperse Polymer Capsules: Tailoring Size, Shell Thickness, and Hydrophobic Cargo Loading via Emulsion Templating," *Adv. Funct. Mater.* 20:1625-1631, 2010.
Dang et al., "Morphology and Dielectric Property of Homogenous BaTiO$_3$/PVDF Nanocomposites Prepared via the Natural Adsorption Action of Nanosized BaTiO$_3$," *Macromol. Rapid Commun.* 26:1185-1189, 2005.
Deng et al., "Novel Method to Fabricate SiO$_2$/Ag Composite Spheres and Their Catalytic, Surface-Enhanced Raman Scattering Properties," *J. Phys. Chem. C* 111:11692-11698, 2007.
Gu et al., "Synthesis and antibacterial property of hollow SiO$_2$/Ag nanocomposite spheres," *Journal of Colloid and Interface Science* 359:327-333, 2011.
Lei et al., "Mesoporous carbon nanospheres with an excellent electrocapacitive performance," *J. Mater. Chem.* 21:2274-2281, 2011.

(Continued)

*Primary Examiner* — Yun Qian
(74) *Attorney, Agent, or Firm* — Seed IP Law Group PLLC

(57) ABSTRACT

Methods of preparing monodispersed polydopamine nano- or microspheres are provided. The methods comprise providing a solvent system comprising water and at least one alcohol having the formula R—OH, wherein R is selected from the group consisting of optionally substituted $C_1$-$C_6$ alkyl, optionally substituted $C_2$-$C_6$ alkenyl, optionally substituted $C_2$-$C_6$ alkynyl, optionally substituted $C_3$-$C_6$ cycloalkyl, optionally substituted $C_3$-$C_6$ cycloalkenyl, and optionally substituted $C_6$-$C_7$ aryl; adding dopamine to said solvent system to form a reaction mixture; and agitating said reaction mixture for a time period of 1 to 10 days to form said monodispersed polydopamine nano- or microspheres. Methods of preparing carbon and hollow metal or metal oxide nano- or microspheres using the polydopamine nano- or microspheres are also provided.

7 Claims, 28 Drawing Sheets

(56) References Cited

OTHER PUBLICATIONS

Lei et al., "Surface patterning using templates: concept, properties and device applications," *Chem. Soc. Rev.* 40:1247-1258, 2011.
Li et al., "Electric energy density of dielectric nanocomposites," *Applied Physics Letters* 90:132901, 2007, 4 pages.
Li et al., "Nanocomposites of Ferroelectric Polymers with $TiO_2$ Nanoparticles Exhibiting Significantly Enhanced Electrical Energy Density," *Adv. Mater.* 21:217-221, 2009.
Lynge et al., "Polydopamine—a nature-inspired polymer coating for biomedical science," *Nanoscale* 3:4916-4928, 2011.
Nam et al., "Nanoparticle-Based Bio-Bar Codes for the Ultrasensitive Detection of Proteins," *Science* 301:1884-1887, Sep. 26, 2003.
Nieto-Márquez et al., "Carbon nanospheres: synthesis, physicochemical properties and applications," *J. Mater. Chem.* 21:1664-1672, 2011.
Ou et al., "Fabrication and biocompatibility investigation of $TiO_2$ films on the polymer substrates obtained via a novel and versatile route," *Colloids and Surfaces B: Biointerfaces* 76:123-127, 2010.
Park et al., "Facile Synthetic Route for Thickness and Composition Tunable Hollow Metal Oxide Spheres from Silica-Templated Coordination Polymers," *Adv. Mater.* 23:3161-3164, 2011.
Pezzella et al., "Atropoisomeric melanin intermediates by oxidation of the melanogenic precursor 5,6-dihydroxyindole-2-carboxylic acid under biomimetic conditions," *Tetrahedron* 58:3681-3687, 2002.
Serp et al., "A chemical vapour deposition process for the production of carbon nanospheres," *Carbon* 39:621-628, 2001.
Si et al., "Preparation and characterization of bio-compatible $Fe_3O_4$@Polydopamine spheres with core/shell nanostructure," *Materials Chemistry and Physics* 128:519-524, 2011.
Tang et al., "Synthesis and capacitive property of hierarchical hollow manganese oxide nanospheres with large specific surface area," *Journal of Power Sources* 193:939-943, 2009.
Wakamatsu et al., "Advanced Chemical Methods in Melanin Determination," *Pigment Cell Res.* 15:174-183, 2002.
Wang et al., "Porous nano-$MnO_2$: large scale synthesis via a facile quick-redox procedure and application in a supercapacitor," *New J. Chem.* 35:469-475, 2011.
Wang et al., "Preparation of novel porous carbon spheres from corn starch," *Colloids and Surfaces A: Physicochem. Eng. Aspects* 346:213-215, 2009.
Xia et al., "Monodispersed Colloidal Spheres: Old Materials with New Applications," *Adv. Mater.* 12(10):693-713.
Xu et al., "Electrochemical properties of nanosized hydrous manganese dioxide synthesized by a self-reacting microemulsion method," *Journal of Power Sources* 180:664-670, 2008.
Yang et al., "A Facile Route to Hollow Superparamagnetic Magnetite/Polystyrene Nanocomposite Microspheres Via Inverse Miniemulsion Polymerization," *Journal of Polymer Science: Part A: Polymer Chemistry* 46:3900-3910, 2008.
Yang et al., "General Synthetic Route toward Functional Hollow Spheres with Double-Shelled Structures," *Angew. Chem. Int. Ed.* 44:6727-6730, 2005.
Yuan et al,. "A novel approach to fabrication of superparamagnetite hollow silica/magnetic composite spheres," *Journal of Magnetism and Magnetic Materials* 322:2172-2176, 2010.
Yuan et al., "Preparation of monodisperse carbon nanospheres for electrochemical capacitors," *Electrochemistry Communications* 10:1067-1070, 2008.
Zajac et al., "The fundamental unit of synthetic melanin: a verification by tunneling microscopy of X-ray scattering results," *Biochimica et Biophysica Acta* 1199: 271-278, 1994.

(A)

(B)

(C)

(D)

(E)

(A)

(B)

(C)

(D)

(A)

(B)

(C)

(D)

(A)

(B) DI-Water (C) H2SO4 (D) KOH (A)

(B)

(C)

(D)

(E)

(F)

(G)

(A)

(B)

(A)

(B)

(B)

(C)

(D)

(A)

(B)

(C)

(D)

(E)

(A)

(B)

(C)

METHODS OF PREPARING MONODISPERSED POLYDOPAMINE NANO- OR MICROSPHERES, AND METHODS OF PREPARING NANO- OR MICROSTRUCTURES BASED ON THE POLYDOPAMINE NANO- OR MICROSPHERES

CROSS-REFERENCE TO RELATED APPLICATION

This application claims the benefit of priority of U.S. provisional application No. 61/583,365 filed on 5 Jan. 2012, the content of which is incorporated herein by reference in its entirety for all purposes.

TECHNICAL FIELD

The invention relates to methods of preparing monodispersed polydopamine nano- or microspheres, and methods of preparing nano- or microstructures, such as carbon and hollow manganese oxide nano- and microspheres, based on the polydopamine nano- or microspheres.

BACKGROUND

Colloidal particles have been studied in wide ranging technical fields such as material science, chemistry, and biology, and are used in many application areas such as food, inks, paints, and coatings.

Among them, monodispersed polymer colloidal particles, such as polystyrene (PS) spheres and poly(methyl methacrylate) (PMMA) spheres, have attracted much attention. Exceedingly uniform spheres may be produced by a process called emulsion polymerization. Such polymer colloids are widely used as templates for 2-dimensional (2D) or 3D arrays, and other applications. However, this method is often tedious in that it requires strict process control. Furthermore, surface of the polymer spheres prepared is passive and further processing is required for surface modification of the spheres.

In view of the above, there is a need for improved methods to form colloidal particles that address at least one of the above-mentioned problems.

SUMMARY

In a first aspect, the invention refers to a method of preparing monodispersed polydopamine nano- or microspheres. The method comprises:
 a) providing a solvent system comprising water and at least one alcohol having the formula R—OH, wherein R is selected from the group consisting of optionally substituted $C_1$-$C_6$ alkyl; optionally substituted $C_2$-$C_6$ alkenyl, optionally substituted $C_2$-$C_6$ alkynyl, optionally substituted $C_3$-$C_6$ cycloalkyl, optionally substituted $C_3$-$C_6$ cycloalkenyl, and optionally substituted $C_6$-$C_7$ aryl;
 b) adding dopamine to said solvent system to form a reaction mixture; and
 c) agitating said reaction mixture for a time period of 1 to 10 days to form said monodispersed polydopamine nano- or microspheres.

In a second aspect, the invention refers to a method of preparing polydopamine nano- or microspheres having a layer of metal formed thereon. The method comprises:
 a) adding a reducing agent and a metal salt or acid thereof to a suspension comprising polydopamine nano- or microspheres prepared by a method according to the first aspect to form a reaction mixture; and
 b) agitating said reaction mixture for a time period of 1 to 48 hours to form a layer of metal on the polydopamine nano- or microspheres.

In a third aspect, the invention refers to a method of preparing polydopamine nano- or microspheres having a layer of metal oxide formed thereon. The method comprises
 a) adding a metal salt or acid thereof and an alkaline solution to a suspension comprising polydopamine nano- or microspheres prepared by a method according to the first aspect to form a reaction mixture; and
 b) agitating said reaction mixture for a time period of 1 to 48 hours to form a layer of metal oxide on the polydopamine nano- or microspheres.

In a fourth aspect, the invention refers to a method of preparing hollow manganese oxide nano- or microspheres. The method comprises
 a) adding a solution containing permanganate ions and an acid to a suspension comprising polydopamine nano- or microspheres prepared by a method according to the first aspect to form a reaction mixture;
 b) agitating said reaction mixture for a time period of 1 to 120 minutes to form a layer of manganese oxide on the polydopamine nano- or microspheres; and
 c) adding an alkaline solution to the suspension to dissolve the polydopamine thereby forming hollow manganese oxide nano- or microspheres.

In a fifth aspect, the invention refers to a method of preparing hollow metal or metal oxide nano- or microspheres. The method comprises
 a) forming a suspension comprising polydopamine nano- or microspheres having a layer of metal formed thereon according to the second aspect, or polydopamine nano- or microspheres having a layer of metal oxide formed thereon according to the third aspect, and
 b) adding an alkaline solution to the suspension to dissolve the polydopamine thereby forming hollow metal or metal oxide nano- or microspheres.

In a sixth aspect, the invention refers to a method of preparing carbon nano- or microspheres. The method comprises heating the polydopamine nano- or microspheres prepared according to the first aspect at a temperature in the range of about 400° C. to about 1000° C. under vacuum or in an inert gas environment.

In a seventh aspect, the invention refers to an electrostatic capacitor comprising polydopamine nano- or microspheres having a layer of metal oxide formed thereon prepared by a method according to the third aspect.

In an eighth aspect, the invention refers to an electrode comprising manganese oxide hollow nano- or microspheres prepared by a method according to the fourth aspect or carbon nano- or microspheres prepared by a method according to the fifth aspect.

In a ninth aspect, the invention refers to a method of forming a porous metal oxide film. The method comprises:
 a) forming a layer of polydopamine nano- or microspheres prepared according to the first aspect on a suitable substrate;
 b) forming a layer of metal oxide on the layer of polydopamine nano- or microspheres; and
 c) removing the underlying layer of polydopamine nano- or microspheres by heating at a temperature in the range of about 400° C. to about 1000° C.

BRIEF DESCRIPTION OF THE DRAWINGS

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

FIG. 11A is a graph showing cyclic voltammetry (CV) curves obtained at various scan rates. FIG. 11B is a graph showing the plotted curve of the variation in the specific capacitance of the carbon spheres as a function of the scan rate. FIG. 11C is a graph showing the plotted curve of the variation in the specific capacitance of the carbon spheres as a function of the current density.

FIG. 14A is a graph showing CV curves obtained at various scan rates. FIG. 14B is a graph showing plotted curve of the variation in the specific capacitance of the hollow $MnO_2$ spheres as a function of the scan rate. FIG. 14C is a graph showing the plotted curve of the variation in the specific capacitance of the hollow $MnO_2$ spheres as a function of the current density. FIG. 14D is a graph showing the plotted curve of the capacitance retention of the hollow $MnO_2$ spheres as a function of the cycle number.

DETAILED DESCRIPTION

Figure 1:
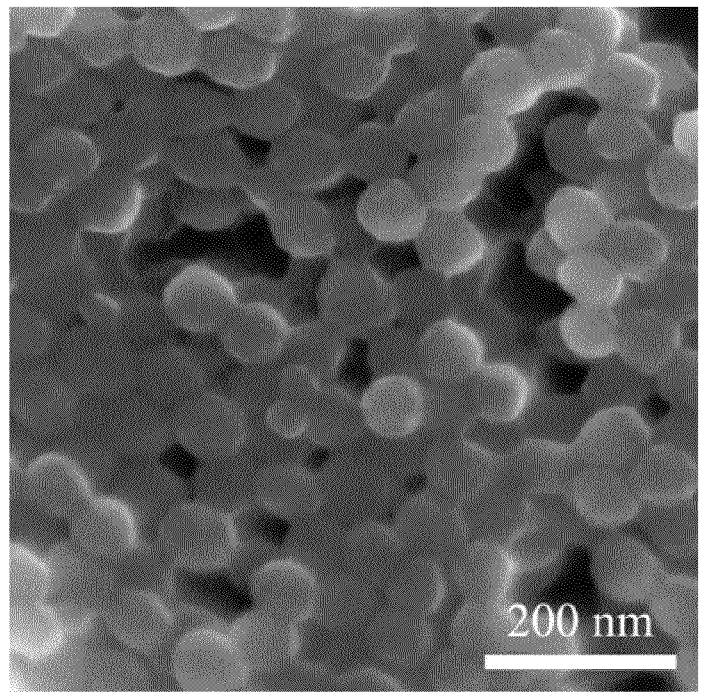
FIG. 1 are field emission scanning electron microscopy (FE-SEM) images of polydopamine (PDA) spheres under various conditions: (A) 0.5 mg ml$^{-1}$ dopamine, $V_{water}$:$V_{ethanol}$=5:1; (B) 1.0 mg ml$^{-1}$ dopamine, $V_{water}$:$V_{ethanol}$=5:1, (C) 1.5 mg ml$^{-1}$ dopamine, $V_{water}$:$V_{ethanol}$=5:1; (D) 2.0 mg ml$^{-1}$ dopamine, $V_{water}$:$V_{ethanol}$=3:2; and (E) 2.0 mg/ml of dopamine and $V_{water}$:$V_{ethanol}$=5:1. Scale bar in (A) and (B) denotes a length of 200 nm and 500 nm respectively. Scale bar in (C), (D) and (E) denotes a length of 1 μm.
Figure 1:
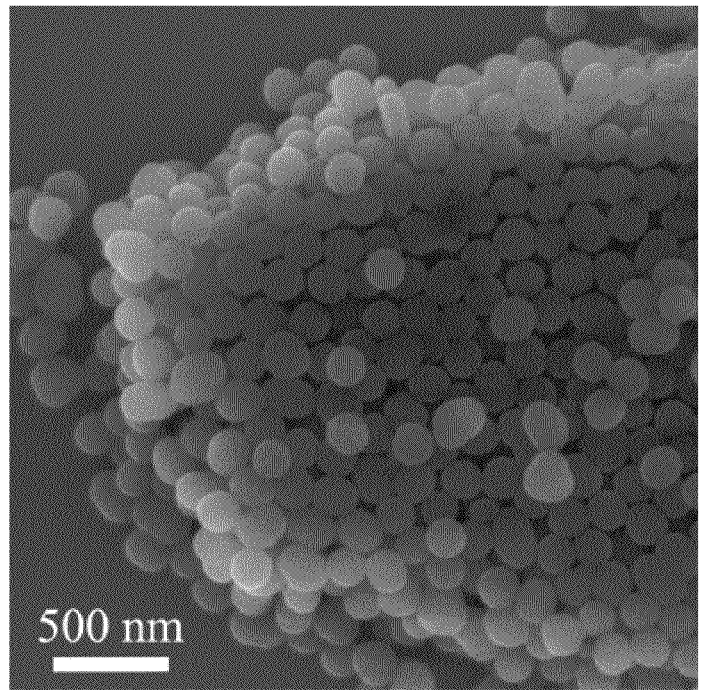
Figure 1:
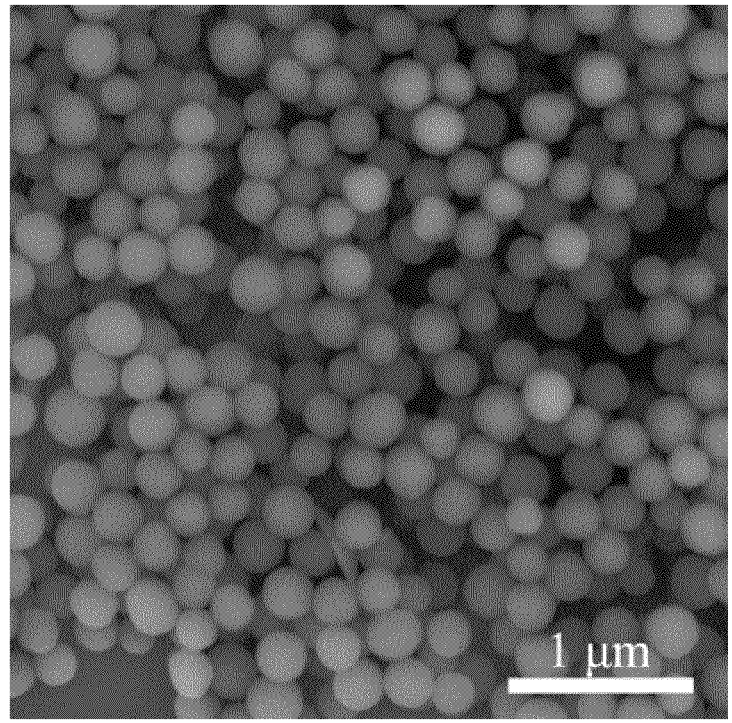
Figure 1:
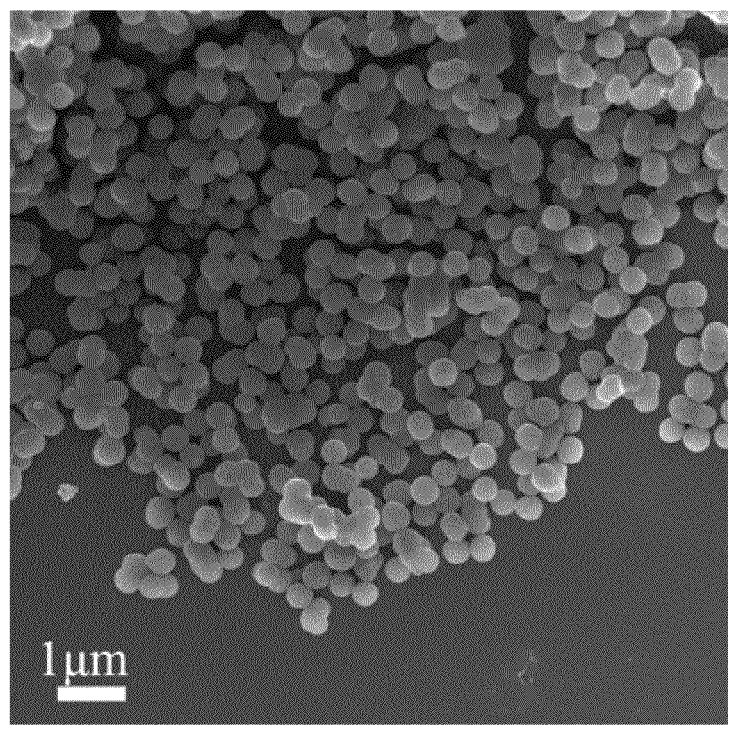
Figure 1:
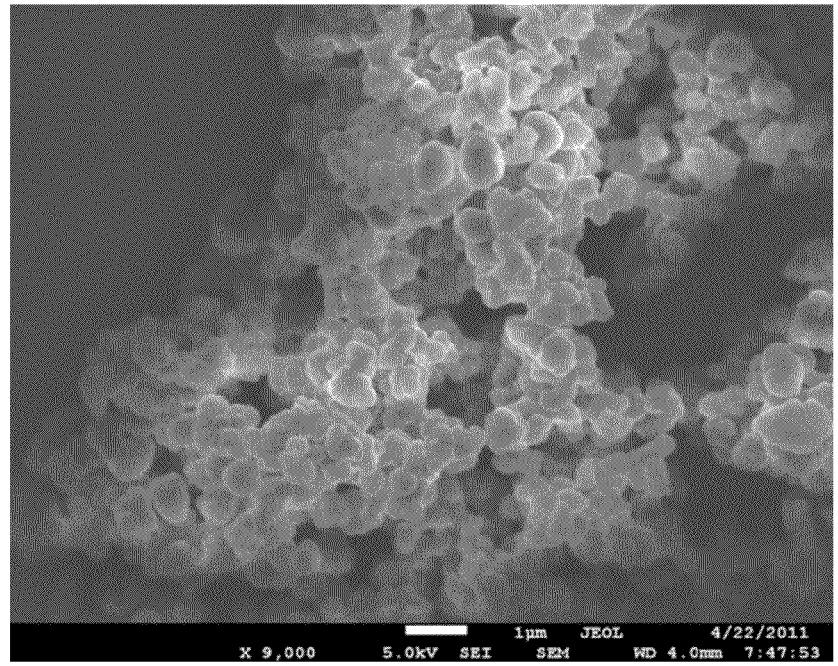

In a first aspect, the invention refers to a method of preparing monodispersed polydopamine (PDA) nano- or microspheres. The method comprises providing a solvent system comprising water and at least one alcohol having the formula R—OH, wherein R is selected from the group consisting of optionally substituted $C_1$-$C_6$ alkyl, optionally substituted $C_2$-$C_6$ alkenyl, optionally substituted $C_2$-$C_6$ alkynyl, optionally substituted $C_3$-$C_6$ cycloalkyl, optionally substituted $C_3$-$C_6$ cycloalkenyl, and optionally substituted $C_6$-$C_7$ aryl; adding dopamine to said solvent system to form a reaction mixture; and agitating said reaction mixture for a time period of 1 to 10 days to form said monodispersed polydopamine nano- or microspheres.

Through various embodiments of the invention, simple, low cost methods to synthesize monodispersed polydopamine spheres are presented. Diameter of the polydopamine nano- or microspheres formed may be tuned easily by, for example, varying the amount of alcohol present or by varying the concentration of dopamine in the reaction mixture. Furthermore, the polydopamine spheres may have active surface groups such as hydroxy (—OH) and amine (—$NH_2$) groups thereby negating the need for any processing to modify or functionalize the surface of the spheres. Versatile utility of the polydopamine spheres has been demonstrated for 3D array fabrication, serving as templates for synthesis of various nanostructures, such as metal or metal oxide coated polydopamine spheres and hollow metal or metal oxide spheres, and establishing them as a general platform for many science and technological applications.

Polydopamine refers to a polymer formed by the polymerization of dopamine, where dopamine refers to a chemical compound having the following formula:

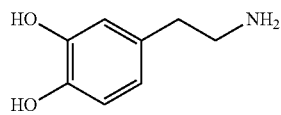 [SMILES: NCCc1ccc(O)c(O)c1]

The method comprises providing a solvent system comprising water and at least one alcohol having the formula R—OH, wherein R is selected from the group consisting of optionally substituted $C_1$-$C_6$ alkyl, optionally substituted $C_2$-$C_6$ alkenyl, optionally substituted $C_2$-$C_6$ alkynyl, optionally substituted $C_3$-$C_6$ cycloalkyl, optionally substituted $C_3$-$C_6$ cycloalkenyl, and optionally substituted $C_6$-$C_7$ aryl.

The term "optionally substituted" refers to a group in which none, one, or more than one of the hydrogen atoms has been replaced with one or more substituent group(s) independently selected from a $C_1$-$C_3$ aliphatic group, hydroxy, alkoxy, cyano, F, Cl, Br, I, nitro, silyl, and amino, including mono- and di-substituted amino groups. As an example, an optionally substituted alkyl group means that the alkyl group may be substituted or unsubstituted. Exemplary substituents include $C_1$-$C_3$ alkoxy, halogen, hydroxyl, amino, sulfonyl, nitro, cyano, and carboxyl. The term "halogen" or "halo" as used herein refers to fluorine, chlorine, bromine or iodine.

The term "optionally substituted $C_1$-$C_6$ alkyl", alone or in combination, refers to a fully saturated aliphatic hydrocarbon. In certain embodiments, an alkyl comprises 1 to 6 carbon atoms, for example 2 to 5 carbon atoms, or 2 to 4 carbon atoms, wherein (whenever it appears herein in any of the definitions given below) a numerical range, such as "1 to 6" or "$C_1$-$C_6$", refers to each integer in the given range, e.g. "$C_1$-$C_6$ alkyl" means that an alkyl group comprising only 1 carbon atom, 2 carbon atoms, 3 carbon atoms, 4 carbon atoms, 5 carbon atoms, or 6 carbon atoms. Examples of alkyl groups include, but are not limited to, methyl, ethyl, n-propyl, isopropyl, n-butyl, isobutyl, sec-butyl, tert-butyl, tert-amyl, pentyl, hexyl, and the like.

The term "optionally substituted $C_2$-$C_6$ alkenyl" refers to an aliphatic hydrocarbon having one or more carbon-carbon double bonds. The $C_2$-$C_6$ alkenyl group may be straight chain or branched chain, and may be substituted or unsubstituted. $C_2$-$C_6$ alkenyl groups include, without limitation, vinyl, allyl, 1-propenyl, 1-butenyl, 2-butenyl, 3-butenyl, 2-methyl-1-propenyl, and 2-methyl-2-propenyl.

The term "optionally substituted $C_2$-$C_6$ alkynyl" refers to an aliphatic hydrocarbon having one or more carbon-carbon triple bonds. The $C_2$-$C_6$ alkynyl group may be straight chain or branched chain, and may be substituted or unsubstituted. Examples of alkynyl groups may be, but are not limited to, ethynyl, 1-propynyl, 2-propynyl, 1-butynyl, 2-butynyl, and 3-butynyl, and the like.

In the context of various embodiments, by "$C_3$-$C_6$ cycloalkyl" is meant a group comprising a non-aromatic ring (i.e. an alicyclic ring) wherein each of the atoms forming the ring is a carbon atom. The $C_3$-$C_6$ cycloalkyl may be formed by three, four, five or six carbon atoms. The $C_3$-$C_6$ cycloalkyl may be substituted or unsubstituted. Examples of $C_3$-$C_6$ cycloalkyl may include cyclopropane, cyclobutane, cyclopentane, and cyclohexane.

In the context of various embodiments, by "$C_3$-$C_6$ cycloalkenyl" is meant a group comprising a non-aromatic ring (i.e. an alicyclic ring) wherein each of the atoms forming the ring is a carbon atom and contains one or more double bonds. The $C_3$-$C_6$ cycloalkenyl may be formed by three, four, five, or six carbon atoms. The $C_3$-$C_6$ cycloalkenyl may be substituted or unsubstituted. Examples of $C_3$-$C_6$ cycloalkenyl include cyclopropene, cyclobutene, cyclopentene, cyclohexene, 1,3-cyclohexadiene, and 1,4-cyclohexadiene, among others.

As used herein, the term "optionally substituted $C_6$-$C_7$ aryl" refers to a group comprising an aromatic ring, wherein each of the atoms forming the ring is a carbon atom. Aromatic in this context means a group comprising a covalently closed planar ring having a delocalized π-electron system comprising 4w+2 π-electrons, wherein w is an integer of at least 1, for example 1 or 2. In the context of the present invention, aryl rings may be formed by 6 or 7 carbon atoms. The $C_6$-$C_7$ aryl may be substituted or unsubstituted. In various embodiments, such a group is a $C_6$ aryl or a $C_7$ aryl. Examples of aryl groups include phenyl and the like.

In various embodiments, the alcohol is a $C_1$-$C_6$ alkyl alcohol. In the context of the invention, a $C_1$-$C_6$ alkyl alcohol refers to a straight chain or branched chain hydrocarbon containing from 1 to 6 carbon atoms, in which one or more of the hydrogen atoms have been replaced with a —OH group. Accordingly, examples of $C_1$-$C_6$ alkyl alcohol include, but are not limited to, methanol, ethanol, n-propyl alcohol, isopropyl alcohol, n-butyl alcohol, isobutyl alcohol, sec-butyl alcohol, tert-butyl alcohol, tert-amyl alcohol, pentyl alcohol, hexyl alcohol, and the like.

The alcohol is at least substantially soluble in water. In various embodiments, the alcohol is completely miscible in water to form a solvent system having a single homogeneous phase. The alcohol may be selected from the group consisting of ethanol, isopropyl alcohol, ethylene glycol, and mixtures thereof. For example, the alcohol may comprise or consist essentially of ethanol. In one embodiment, the alcohol consists of ethanol.

Dopamine is added to the solvent system to form a reaction mixture. The dopamine may be added to the solvent system in any suitable manner. For example, a solution comprising dopamine may be added to the solvent system in a dropwise manner, or may be poured into the solvent system to form the reaction mixture.

The method of the first aspect comprises agitating the reaction mixture for a time period of 1 to 10 days to form the monodispersed polydopamine nano- or microspheres. Agitating of the reaction mixture may be carried out by standard mixing methods known in the art. Any suitable mixing or agitating device may be used. In various embodiments, the agitation is carried out by sonicating or stirring or shaking the reaction mixture. In some embodiments, agitating of the reaction mixture is carried out by stirring. In embodiments where sonication is used as the agitation method, wattage on the sonicator may additionally be varied to achieve a specific level of agitation. A person skilled in the art is able to choose and determine the appropriate mixing time and settings based on the agitation method used.

The polydopamine nano- or microspheres, also referred herein as polydopamine spheres or particles, may be at least substantially spherical. The size of the polydopamine nano- or microspheres may be characterized by their mean diameter. The term "diameter" as used herein refers to the maximal length of a straight line segment passing through the center of a figure and terminating at the periphery. The term "mean diameter" refers to an average diameter of the particles, and may be calculated by dividing the sum of the diameter of each particle by the total number of particles. Although the term "diameter" is used normally to refer to the maximal length of a line segment passing through the centre and connecting two points on the periphery of a sphere, it is also used herein to refer to the maximal length of a line segment passing through the centre and connecting two points on the periphery of particles which are not perfectly spherical.

The term "nanospheres" or "nanoparticles" as used herein refers to particles which are at least substantially spherical and having a mean diameter that is 100 nm or below. In various embodiments, the mean diameter of the polydopamine nano- or microspheres is in the range of about 50 nm to about 500 nm, such as about 50 nm to about 300 nm, about 50 nm to about 200 nm, about 50 nm to about 150 nm, about 100 nm to about 300 nm, about 150 nm to about 300 nm, about 100 nm to about 200 nm, about 500 nm, about 400 nm, about 300 nm, about 200 nm, about 100 nm, about 50 nm, or about 20 nm.

Size of the polydopamine spheres may be affected by the volumetric ratio of water to alcohol and the concentration of dopamine in the reaction mixture. Generally, for a given concentration of dopamine in the reaction mixture, an increase in volumetric ratio of water to alcohol results in an increase in diameter of the polydopamine spheres. Accordingly, to obtain polydopamine spheres of a higher diameter, a, higher volumetric ratio of water to alcohol may be used.

Generally, the volumetric ratio of water to alcohol in the solvent system may be in the range of about 20:1 to about 3:2, such as about 20:1 to about 2:1, about 15:1 to about 2:1, about 10:1 to about 2:1, about 20:1 to about 15:1, about 20:1 to about 10:1, about 15:1 to about 5:1, or about 10:1 to about 5:1. In some embodiments, the volumetric ratio of water to alcohol in the solvent system is in the range of about 5:1 to about 3:2.

Concentration of dopamine in the reaction mixture may also be varied to affect the size of the polydopamine spheres formed. Generally, size of the polydopamine spheres increases with increase in concentration of dopamine in the reaction mixture. Concentration of dopamine in the reaction mixture may be in the range of about 0.5 mg/ml to about 2.0 mg/ml, such as about 0.5 mg/ml to about 1.5 mg/ml, about 0.5 mg/ml to about 1.0 mg/ml, about 0.5 mg/ml, about 1.0 mg/ml, about 1.5 mg/ml, or about 2.0 mg/ml.

In various embodiments, monodispersed polydopamine particles having a mean diameter in the range of about 70 nm to about 170 nm are obtained when concentration of dopamine in the reaction mixture is less than 1 mg/ml, and volumetric ratio of water to alcohol is less than 5:1.

The polydopamine nano- or microspheres formed are monodispersed. Monodispersity is generally characterized by a low coefficient of variation (or variance), defined as the quotient of the standard deviation on the size distribution divided by the average particle size. This value is often expressed as a percentage. In the context of the present application, the variance may be calculated using the diameter of the particles. In various embodiments, the polydopamine nano- or microspheres have a size variation or a variance value of less than 10%, such as less than 8%, less than 6%, less than 5%, or less than 3%.

The reaction mixture may be agitated for a time period of 1 to 10 days to form the monodispersed polydopamine nano- or microspheres. In various embodiments, agitating of the reaction mixture is carried out for about 2 days to about 5 days, such as about 2 days, about 3 days, about 4 days, or about 5 days. The amount of time at which agitation is carried out may correspond to the time required for polymerization of dopamine to polydopamine. All of the mentioned time specifications may be the lower or upper limit of a respective time range.

The method may be carried out at any suitable temperature, such as about 1° C. to about 50° C., about 20° C. to about 40° C., about 20° C. to about 30° C., or about 25° C. Advantageously, the method of the first aspect may be carried out at room temperature, which means that no heating or cooling of the reagent is required.

The solvent system or the reaction mixture may further comprise Tris-buffer solution. The term "Tris-buffer solution" refers to a buffer solution comprising tris(hydroxymethyl)-amino-methane having the chemical formula $(HOCH_2)_3CNH_2$. The buffer solution may be used to maintain the pH of the solvent system at a constant level. In various embodiments, the buffer solution has an effective pH range between 7.1 and 9.0. The concentration of tris(hydroxymethyl)-amino-methane in the Tris-buffer solution may range from about 1 mg/ml to about 2 mg/ml, such as about 1 mg/ml to about 1.4 mg/ml, about 1.4 mg/ml to about 1.8 mg/ml, or about 1.2 mg/ml. In one embodiment, the concentration of tris(hydroxymethyl)-amino-methane in the Tris-buffer solution is about 1.21 mg/ml.

In various embodiments, the method of the first aspect includes separating the polydopamine nano- or microspheres from the reaction mixture. The reaction mixture may be centrifuged before separating the supernatant and the polydopamine particles formed. The centrifugation may be carried out for at least about 5 minutes, at least about 10 minutes, at least about 15 minutes, at least about 20 minutes, at least about 25 minutes, at least about 30 minutes, at least about 35 minutes, at least about 40 minutes, at least about 45 minutes, at least about 50 minutes, or at least about 55 minutes. The centrifugation speed may be, but is not limited to, less than or equal to about 12,000 rpm, such as about 8,000 rpm to about 12,000 rpm, about 10,000 rpm to about 12,000 rpm, about 5,000 rpm to about 8,000 rpm, about 4,000 rpm to about 6,000 rpm, about 12,000 rpm, about 10,000 rpm, about 8,000 rpm, about 6,000 rpm, about 5,000 rpm, or about 4,000 rpm.

In some embodiments, the method of the first aspect includes cleaning the polydopamine nano- or microspheres. For example, the polydopamine nano- or microspheres may be rinsed or washed with a suitable reagent such as water and/or ethanol for one time, or a number of times to remove residual alcohol and/or buffer solution that is present on the surface of the particles.

As mentioned above, the polydopamine particles formed may be used as a template for formation of other nanostructures. Accordingly, in a second aspect, the invention refers to a method of preparing polydopamine nano- or microspheres having a layer of metal formed thereon. The polydopamine nano- or microspheres coated with a layer of metal may be used for example, in catalysis and in surface enhanced Raman spectroscopy (SERS) applications.

The method includes adding a reducing agent and a metal salt or acid thereof to a suspension comprising polydopamine nano- or microspheres prepared by a method according to the first aspect to form a reaction mixture; and agitating said reaction mixture for a time period of 1 to 48 hours to form a layer of metal on the polydopamine nano- or microspheres.

The reducing agent may be selected from the group consisting of sodium citrate, citric acid, and mixtures thereof. In various embodiments, the reducing agent comprises sodium citrate. In one embodiment, the reducing agent consists essentially of sodium citrate.

In various embodiments, the reducing agent reduces the metal ion of the metal salt or acid thereof in the reaction mixture to form a layer of metal on the polydopamine nano- or microspheres. Generally, any salt of a metal ion, or its acid, that is able to be reduced by the reducing agent and precipitate out in its metal form in the reaction mixture may be used. For example, the metal salt may be a monovalent metallic salt such as a silver salt or a gold salt, or a bivalent metallic salt, such as iron, copper, manganese and zinc. Suitable salts of the metal may include, but are not limited to, halides, carbonates, sulfates, nitrates and phosphates.

In various embodiments, a metal salt is added along with a reducing agent to a suspension comprising polydopamine nano- or microspheres according to the first aspect to form a reaction mixture. The metal salt may be a solid or in the form of a salt solution. For example, the metal salt may be dissolved in an aqueous solution to form a salt solution, wherein the metal salt dissociates into its constituent metal ions and anions. In various embodiments, the metal salt is a solid, wherein upon addition to the reaction mixture, it dissociates into its constituent metal ions and anions. The reducing agent that is present in the reaction mixture may then reduce the monovalent or the bivalent metal ions into its zerovalent state to form a layer of metal on the polydopamine nano- or microspheres.

In various embodiments, the metal salt comprises a silver salt or a gold salt. In some embodiments, the metal salt comprises a silver salt. Examples of silver salt include, but are not limited to, silver nitrate, silver chloride, silver acetate, silver benzoate, silver carbonate, silver iodate, silver iodide, silver lactate, silver laurate, and silver oxide. In various embodiments, the metal salt comprises or consists essentially of silver nitrate. In other embodiments, the metal salt comprises a gold salt. Examples of gold salt include, but are not limited to, a lithium salt of tetrachloroauric acid, a sodium salt of tetrachloroauric acid, a potassium salt of tetrachloroauric acid, a lithium salt of tetrabromoauric acid, a sodium salt of tetrabromoauric acid, a potassium salt of tetrabromoauric acid, a sodium salt of tetracyanoauric acid and a potassium salt of tetracyanoauric acid. In line with the above discussion, the acid forms of the respective gold salts listed, such as chloroauric acid ($HAuCl_4$) and tetrabromoauric acid ($HAuBr_4$) may also be used. Chloroauric acid, for example, dissociates in an aqueous solution into gold ions and $AuCl_4^-$ anions.

As mentioned above, the reducing agent that is present in the reaction mixture may reduce the monovalent or the bivalent metal ions into its zerovalent state, such that the metal ions precipitate out in the reaction mixture in their metal form, as metal nanoparticles. The metal nanoparticles may be held in place on the polydipamine nano- or microspheres by the active surface groups, such as hydroxyl (—OH) and amine (—$NH_2$) groups on the polydipamine spheres. In embodiments whereby a silver salt is used, the layer of metal formed on the polydopamine nano- or microspheres may comprise or consist essentially of silver nanoparticles. The silver nanoparticles may bind to the active surface groups, such as hydroxyl (—OH) and amine (—$NH_2$) groups on the polydipamine spheres, which then holds the silver nanoparticles in place to form a layer of metal on the polydopamine nano- or microspheres. In various embodiments, the silver nanoparticles have a mean diameter in the range of about 10 nm to about 20 nm, such as about 10 nm to about 18 nm, about 10 nm to about 15 nm, about 12 nm to about 18 nm, about 10 nm, about 15 nm or about 20 nm.

The reducing agent or the metal salt may be added together or separately to the suspension comprising polydopamine nano- or microspheres. In various embodiments, the reducing agent is added to the suspension comprising polydopamine nano- or microspheres prior to adding the metal salt.

The method includes agitating the reaction mixture for a time period of 1 to 48 hours to form a layer of metal on the polydopamine nano- or microspheres. Examples of agitation methods have already been mentioned above. In various embodiments, the reaction mixture is agitated by stirring.

In various embodiments, agitating of the reaction mixture is carried out for about 1 hour to about 48 hours, such as about 1 hour to about 24 hours, about 1 hour to about 12 hours, about 1 hour to about 5 hours, about 2 hours to about 4 hours, about 1 hour, about 2 hours, about 3 hours or about 4 hours. The amount of time at which agitation is carried out may be the time required for formation of the metal layer on the polydopamine nano- or microspheres. Generally, the method according to the second aspect forms a layer of metal on the polydopamine nano- or microspheres in less than 10 hours. All of the mentioned time specifications may be the lower or upper limit of a respective time range.

The metal layer may be formed at any suitable temperature. In various embodiments, agitating is carried out at a temperature of about 1° C. to about 30° C., such as about 1° C. to about 20° C., about 1° C. to about 10° C., about 10° C. to about 30° C., about 20° C. to about 30° C., about 25° C. to about 30° C., about 25° C., about 20° C., about 15° C., about 10° C., about 5° C., or about 1° C. In various embodiments, the suspension containing polydopamine particles is kept in an ice-water bath when the metal salt is added to the suspension.

The method according to the second aspect may further include separating the metal layer-coated polydopamine nano- or microspheres from the reaction mixture, and/or cleaning the metal layer-coated polydopamine nano- or microspheres, using methods such as that discussed above.

The polydopamine nano- or microspheres formed may also be used as a template for formation of polydopamine nano- or microspheres coated with a layer of metal oxide. Accordingly, in a third aspect, the invention relates to a method of preparing polydopamine nano- or microspheres having a layer of metal oxide formed thereon.

The method comprises adding a metal salt or acid thereof and an alkaline solution to a suspension comprising polydopamine nano- or microspheres prepared by a method according to the first aspect to form a reaction mixture; and agitating said reaction mixture for a time period of 1 to 48 hours to form a layer of metal oxide on the polydopamine nano- or microspheres.

Generally, any metal salts or acid thereof comprising metal ions which are able to chemically interact with the functional groups —OH and —NH of polydopamine may be used. Examples of suitable metal salt include, but are not limited to, tin salts and iron salts. In various embodiments, the metal salt comprises a mixture of iron (II) chloride and iron (III) chloride. The iron (II) chloride and iron (III) chloride may be present in any suitable ratio. In various embodiments, the metal salt comprises a mixture of iron (II) chloride and iron (III) chloride present in a molar ratio of about 1:2.

As in the case for the second aspect, the metal oxide layer may comprise or consist essentially of metal oxide nanoparticles. In various embodiments, when the metal salt comprises iron (II) chloride and iron (III) chloride, a layer of iron (II, III) oxide ($Fe_3O_4$) is formed on the polydopamine particles. The layer of $Fe_3O_4$ may comprise or consist essentially of $Fe_3O_4$ nanoparticles. The $Fe_3O_4$ nanoparticles may have a mean diameter in the range of about 10 nm to about 20 nm, such as about 10 nm to about 18 nm, about 10 nm to about 15 nm, about 12 nm to about 18 nm, about 10 nm, about 15 nm or about 20 nm. In other embodiments when the metal salt comprises tin (II) chloride, the metal oxide formed may comprise tin (IV) oxide ($SnO_2$). The tin (IV) oxide may form a layer on the surface of the polydopamine particles and may comprise or consist essentially of tin oxide nanoparticles. Size of the tin oxide nanoparticles may be similar to that of the $Fe_3O_4$ nanoparticles.

The alkaline solution may be selected from the group consisting of potassium hydroxide, sodium hydroxide, ammonium hydroxide, and mixtures thereof. In various embodiments, the alkaline solution consists essentially of potassium hydroxide. The alkaline solution may be added in a dropwise fashion to the reaction mixture. Generally, the order in which the metal salt and the alkaline solution are added to the suspension is not important, and may accordingly be added separately or at the same time to the suspension.

For the PDA spheres to remain stable in solution, the pH of the reaction mixture may be less than or equal to 10, such as 6, 7, 8, 9 or 10. Accordingly, the amount of alkaline solution added may be an amount such that the pH of the reaction mixture is less than or equal to 10, which may in turn depend on the type of alkaline solution used and its concentration.

The method of the third aspect further includes agitating the reaction mixture for a time period of 1 to 48 hours to form a layer of metal oxide on the polydopamine nano- or microspheres.

Examples of agitation methods have already been mentioned above. In various embodiments, the reaction mixture is agitated by stirring. Agitating of the reaction mixture may be carried out for about 1 hour to about 48 hours, such as about 1 hour to about 24 hours, about 1 hour to about 12 hours, about 1 hour to about 5 hours, about 2 hours to about 4 hours, about 1 hour, about 2 hours, about 3 hours or about 4 hours. The amount of time at which agitation is carried out may be the time required for formation of the metal oxide layer on the polydopamine nano- or microspheres. Generally, the method according to the third aspect forms a layer of metal oxide on the polydopamine nano- or microspheres in less than 10 hours. All of the mentioned time specifications may be the lower or upper limit of a respective time range.

The metal oxide layer may be formed at any suitable temperature. In various embodiments, agitating is carried out at a temperature of about 1° C. to about 50° C., such as about 20° C. to about 40° C., about 20° C. to about 30° C., or about 25° C. In various embodiments, the method of the third aspect is carried out at room temperature.

Methods of separating metal oxide-coated polydopamine nano- or microspheres from the reaction mixture, and cleaning the metal oxide-coated polydopamine nano- or microspheres, such as that mentioned above for metal-coated polydopamine nano- or microspheres, may also be applied.

The metal oxide coated polydopamine nano- or microspheres may be used, for example, to form electrodes, or to form electrostatic capacitors.

The polydopamine nano- or microspheres prepared by a method according to the first aspect may also be used as a template to form manganese oxide hollow particles. Accordingly, in a fourth aspect, a method of preparing hollow manganese oxide nano- or microspheres is provided. The method comprises adding a solution containing permanganate ions and an acid to a suspension comprising polydopamine nano- or microspheres prepared by a method according to the first aspect to form a reaction mixture; agitating said reaction mixture for a time period of 1 to 120 minutes to form a layer of manganese oxide on the polydopamine nano- or microspheres; and adding an alkaline solution to the suspension to dissolve the polydopamine thereby forming hollow manganese oxide nano- or microspheres.

The solution containing permanganate ions may be sodium permanganate, potassium permanganate, or mixture thereof. In various embodiments, the solution containing permanganate ions comprises or consists essentially of potassium permanganate.

Examples of acid that may be used include, but are not limited to, hydrochloric acid, sulfuric acid, phosphoric acid, formic acid, glycolic acid, citric acid, or mixtures thereof. In various embodiments, the acid comprises or consists essentially of sulfuric acid.

The alkaline solution may be selected from the group consisting of potassium hydroxide, sodium hydroxide, ammonium hydroxide, and mixtures thereof. In various embodiments, the alkaline solution consists essentially of potassium hydroxide. The alkaline solution may be used to dissolve polydopamine, so as to form hollow manganese oxide nano- or microspheres. Any suitable amount of alkaline solution that is able to dissolve the polydopamine nano- or microspheres may be used. In various embodiments, adding the alkaline solution to the suspension comprises adding the alkaline solution in an amount such that the pH of the suspension is greater than or equal to 12, such as 12, 13 or 14.

In various embodiments, agitating of the reaction mixture is carried out for about 1 minute to about 120 minutes, such as about 1 minute to about 60 minutes, about 1 to about 30 minutes, about 1 minute to about 10 minutes, about 1 minutes to about 5 minutes, about 1 minute, about 2 minutes, about 3 minutes or about 4 minutes. The amount of time at which agitation is carried out may be the time required for formation of the manganese oxide coated polydopamine particles. In various embodiments, alkaline solution is added to the suspension containing manganese oxide coated polydopamine particles under agitation. The time period mentioned above may also include the time that is required to dissolve polydopamine to form the hollow manganese oxide particles. The time required to dissolve polydopamine may depend on, for example, the type of alkaline solution used and its concentration. Stronger alkaline solutions such as potassium hydroxide may require a shorter time to dissolve the polydopamine. Generally, the method of the fourth aspect may be carried out in less than 10 minutes. All of the mentioned time specifications may be the lower or upper limit of a respective time range.

The hollow manganese oxide nano- or microspheres may be formed at any suitable temperature. In various embodiments, agitating is carried out at a temperature of about 1° C. to about 50° C., such as about 20° C. to about 40° C., about 20° C. to about 30° C., or about 25° C. In various embodiments, the hollow manganese oxide nano- or microspheres are formed at room temperature.

Methods of separating the hollow manganese oxide nano- or microspheres from the reaction mixture, and cleaning the hollow manganese oxide nano- or microspheres, such as that used in the corresponding methods mentioned, above for metal-coated polydopamine nano- or microspheres, may also be applied.

In a fifth aspect, the invention refers to a method of preparing hollow metal or metal oxide nano- or microspheres. The method comprises forming a suspension comprising polydopamine nano- or microspheres having a layer of metal formed thereon according to the second aspect, or polydopamine nano- or microspheres having a layer of metal oxide formed thereon according to the third aspect, and adding an alkaline solution to the suspension to dissolve the polydopamine thereby forming hollow metal or metal oxide nano- or microspheres.

By first coating the polydopamine nano- or microspheres with a layer of metal or a layer of metal oxide, and subsequently dissolving the polydopamine core with an alkaline solution, hollow metal or metal oxide nano- or microspheres may be obtained. Examples of alkaline solution that may be used have already been mentioned above. As in the case for forming hollow manganese oxide particles, the amount of alkaline solution used may be any suitable amount that is able to dissolve the polydopamine nano- or microspheres. In various embodiments, adding the alkaline solution to the suspension comprises adding the alkaline solution in an amount such that the pH of the suspension is greater than or equal to 12, such as 12, 13 or 14. Furthermore, the temperature at which the process is carried out may take place at any suitable temperature, such as that mentioned above for forming hollow manganese oxide particles.

In a further aspect, the invention relates to a method of preparing carbon nano- or microspheres. The method comprises heating the polydopamine nano- or microspheres prepared according to the first aspect at a temperature in the range of about 400° C. to about 1000° C. under vacuum or in an inert gas environment. For example, the polydopamine particles may be heated at a temperature in the range of about 500° C. to about 900° C., about 750° C. to about 1000° C., or about 650° C. to about 950° C. In various embodiments, the polydopamine nano- or microspheres are heated at a temperature of about 900° C.

The polydopamine nano- or microspheres may be heated in vacuum or in an inert gas environment. Examples of an inert gas include nitrogen and noble gases such as helium, neon, argon, krypton, xeon, and mixtures thereof. In various embodiments, the polydopamine particles are heated in vacuum to form the carbon particles.

Advantageously, use of polydopamine as template translates into in a simple and low cost method to form carbon particles. Furthermore, the carbon particles that are formed in this way demonstrates good power density and energy density values, which render them suitable for use as supercapacitor electrode materials.

In a seventh aspect, the invention relates to an electrostatic capacitor comprising polydopamine nano- or microspheres having a layer of metal oxide formed thereon prepared by a method according to the third aspect.

In an eighth aspect, the invention refers to an electrode comprising manganese oxide hollow particles prepared by a method according to the fourth aspect or carbon particles prepared by a method according to the fifth aspect.

The manganese oxide hollow particles or carbon nano- or microspheres may be mixed with carbon black and/or a binder such as polyvinylidenefluoride for example to form a nanocomposite, prior to formation of the electrode.

In a further aspect, the invention refers to a method of forming a porous metal oxide film. The method comprises forming a layer of polydopamine nano- or microspheres prepared according to the first aspect on a suitable substrate; forming a layer of metal oxide on the layer of polydopamine nano- or microspheres; and removing the underlying layer of polydopamine nano- or microspheres by heating at a temperature in the range of about 400° C. to about 1000° C.

Generally, a suitable metal oxide may comprise an electrochromic oxide that may be electrodeposited onto the polydopamine spheres. Examples of metal oxide that may be used include, but are not limited to, cathodic colored oxides such as oxides of titanium (Ti), niobium (Nb), molybdenum (Mo), tantalum (Ta), or tungsten (W), and anodic colored oxides such as oxides of vanadium (V), chromium (Cr), manganese (Mn), iron (Fe), cobalt (Co), nickel (Ni), rhodium (Rh) or iridum (Ir). In various embodiments, the metal oxide comprises or consists essentially of tungsten oxide. In some embodiments, the metal oxide consists of tungsten oxide.

In various embodiments, the metal oxide is dissolved in a suitable solvent to form a solution prior to dispersing on the layer of polydopamine nano- or microspheres layer. In embodiments where the metal oxide comprises tungsten oxide, for example, tungsten oxide may first be treated with hydrogen peroxide followed by addition to an alcohol, for example, ethanol or isopropyl alcohol. The amount of peroxide preferably ranges from about 0.2 to about 2.0 moles of hydrogen peroxide per mole of tungsten, more preferably from about 0.7 to about 1.3 moles of hydrogen peroxide per mole of tungsten. By heating the substrate comprising the multilayer film of polydopamine nano- or microspheres layer and metal oxide layer at a temperature in the range of about 400° C. to about 1000° C., the polydopamine may be burned off, leaving behind the metal oxide layer, which may be porous. In various embodiments, the polydopamine nano- or microspheres layer is removed by heating at a temperature of about 400° C. in air. The time required to remove the layer may depend, for example, on the thickness of the layer and the size of the polydopamine particles. In some embodiments, the polydopamine nano- or microspheres layer is removed by heating for 3 hours at a temperature of about 400° C. in air. In this regard, the polydopamine nano- or microspheres act as a template for formation of the porous metal oxide layer, wherein use of the polydopamine nano- or microspheres results in an increase in porosity of the metal oxide layer. This, in turn, translates into improved electrochromic performance of the porous metal oxide layer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

A key step to fabricate PDA spheres is to control the spheres growth process through the introduction of an alcohol such as ethanol. It was surprisingly found by the inventors that dopamine was able to polymerize in DI-water with aqueous Tris buffer solution, and was not able to polymerize in ethanol. It indicates that ethanol could impede the polymerization of dopamine. Therefore, ethanol was used in various embodiments to control the polymerization process of dopamine to obtain PDA spheres.

Example 1

Synthesis of Polydopamine (PDA) Spheres

Synthesis of PDA spheres was carried out in a water-alcohol mixed solvent. Briefly, the Tris-buffer solution (1.21 mg ml$^{-1}$ based on DI-water) was first mixed with alcohol (ethanol, isopropyl alcohol (IPA), or ethylene glycol (EG), or the mixture) in various volume ratios. Subsequently, dopamine was added to the mixed solution in different concentrations in the range from 0.5 mg ml$^{-1}$ to 2.0 mg ml$^{-1}$ (based on DI-water). The resultant solution was stirred for more than 3 days to allow reaction to be carried out for formation of PDA spheres. The product was centrifuged and washed thrice with DI-water. Washed powders were freeze dried.

Example 2

Synthesis of PDA/Fe$_3$O$_4$ Core/Shell Spheres 5.0 mg PDA spheres were dispersed in 30 ml DI-water with or without ethylene glycol by sonication. Iron (II) chloride (FeCl$_2$) (0.15 mmol) and iron (III) chloride (FeCl$_3$) (0.3 mmol) mixed solution (20 ml) was added in PDA spheres suspension under stirring. Potassium hydroxide (KOH) solution (0.85 mmol) was then added to the PDA spheres suspension in a drop-wise fashion. After the reaction, the product solution was centrifuged and washed thrice with DI water. Washed powders were dried at 60° C.

Example 3

Synthesis of PDA/Ag Core Shell Spheres 9.0 mg PDA spheres were dispersed in 30 ml DI-water by sonication. 600.0 mg of sodium citrate was added in PDA spheres suspension under stirring. 20 ml silver nitrate (AgNO$_3$) (88 mg) solution was then added to the PDA spheres suspension under stirring in ice-water bath. The solution was stirred for several hours. After the reaction, the product solution was centrifuged and washed thrice with DI-water. Washed powders were dried at 60° C.

Example 4

Synthesis of Carbon Spheres

Carbon spheres were fabricated by post-annealing the PDA spheres using tube furnace. Typically, the PDA spheres were placed at the center of the furnace. Firstly, the pressure inside the tube was pumped to $1.4\times10^{-3}$ mbar. Subsequently, the furnace was heated up to 900° C. at a rate of 5° C. min$^{-1}$ and kept for 4 hours. After cooling down, the product was collected.

Example 5

Synthesis of Manganese Dioxide (MnO$_2$) Hollow Spheres 40.0 mg PDA spheres were dispersed in 30 ml DI-water by sonication. 20 ml potassium permanganate (KMnO$_4$) (0.6 mmol) solution and 0.3 ml sulfuric acid (H$_2$SO$_4$) (1 M) solution were added in PDA spheres suspension under stirring. The reaction was very fast and finished within 2 minutes. After the reaction was carried out, core of the PDA spheres were removed using KOH. The product solution was centrifuged and washed thrice with DI-water. Washed powders were dried at 60° C.

Example 6

Characterization Methods

Phase of the product was identified by X-ray powder diffraction (XRD, Shimadzu), using Cu K$\alpha$ ($\lambda$=0.15406 nm) radiation at 50 kV and 50 mA. The morphology and structure of the products were characterized by field emission scanning electron microscopy (FE-SEM, JEOL 7600F), transmission electron microscopy (TEM, JEOL 2010) and high resolution transmission electron microscopy (HRTEM).

FIG. 1A to C are SEM images depicting the PDA spheres synthesized respectively at a dopamine concentration of 0.5, 1.0 and 1.5 mg ml$^{-1}$ (based on DI-water) while the volume ratio of DI-water to ethanol is fixed at 5:1. Monodisperse PDA spheres with diameters around 70 nm and 170 nm may be seen in FIGS. 1A and B respectively. It is noted that not all the PDA spheres exhibit ideal sphere-like shape. Some of the PDA spheres show shape-deformation. When the dopamine concentration was increased to 1.5 mg ml$^{-1}$, the diameter of PDA spheres varied from about 200 nm to about 300 nm. With further increase of dopamine concentration up to 2.0 mg ml$^{-1}$ ($V_{water}:V_{ethanol}$=5:1), no PDA spheres were obtained (see FIG. 1E).

Figure 2:
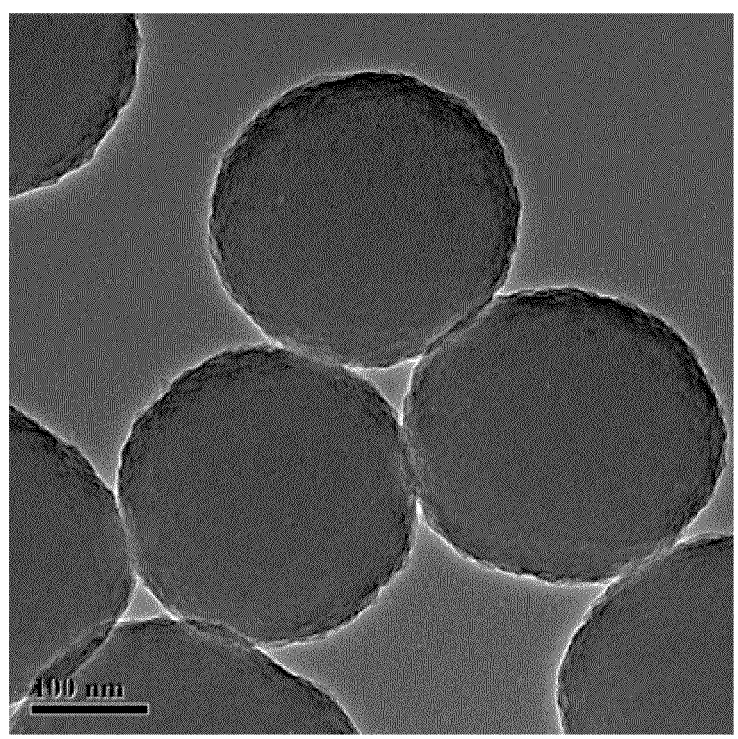
FIG. 2 is a transmission electron microscopy (TEM) image of the PDA spheres obtained at 1.8 mg/ml of dopamine and $V_{water}$:$V_{ethanol}$=5:1. Scale bar denotes a length of 100 nm.

However, when the volume ratio of DI-water to ethanol is changed to 3:2, large PDA spheres (FIG. 1D) with diameter around 400 nm can be obtained at a dopamine concentration of 2.0 mg ml$^{-1}$. This shows that the diameter of PDA spheres increases with the increase in dopamine concentration. It suggests that the diameter of the PDA spheres may be easily controlled by the dopamine concentration. Furthermore, it reveals that the volume ratio of DI-water to ethanol has a strong influence on the synthesis of the monodisperse PDA spheres. The PDA spheres were further observed by transmission electron microscopy (TEM). It is seen that the PDA spheres exhibit good spherical shape, but the surface is not ideally smooth (see TEM image, FIG. 2).

Figure 3:
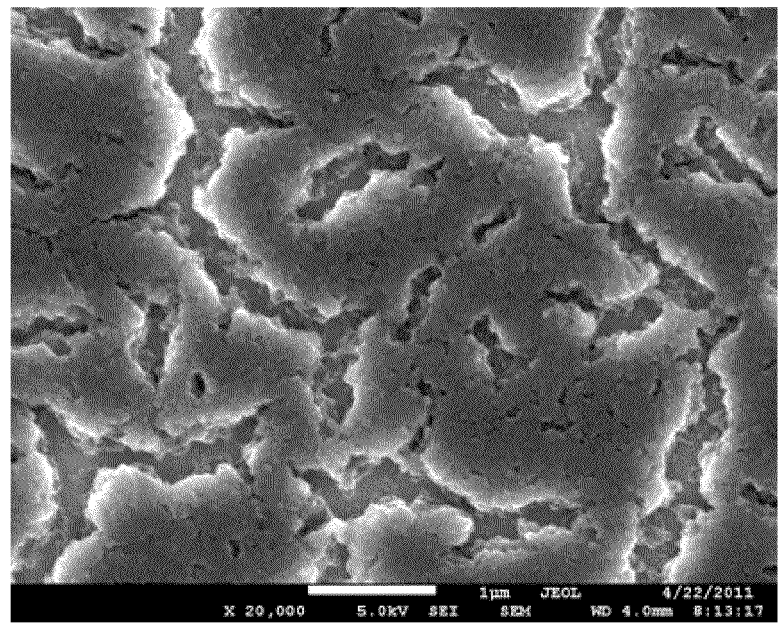
FIG. 3 are scanning electron microscopy (SEM) images of the polydopamine spheres obtained at various $V_{water}$:$V_{ethanol}$ with dopamine concentration fixed at 0.5 mg/ml: (A) 5:2, (B) 5:1, (C) 10:1, (D) 20:1. Scale bar in (A), (B) and (D) denotes a length of 1 μm. Scale bar in (C) denotes a length of 100 nm.
Figure 3:
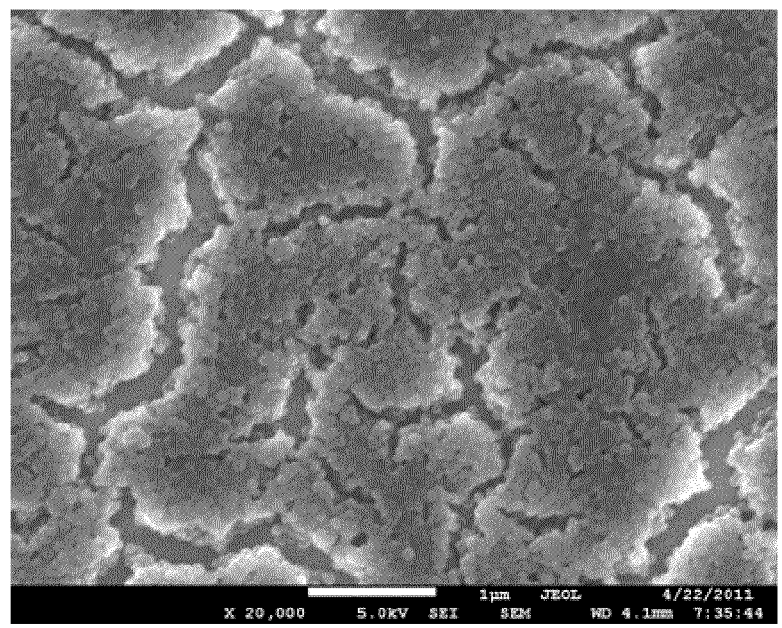
Figure 3:
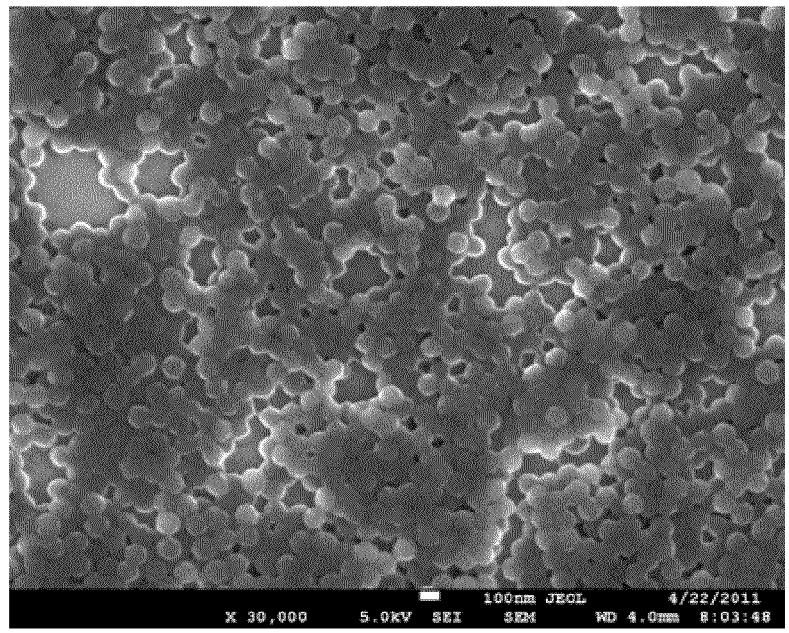
Figure 3:
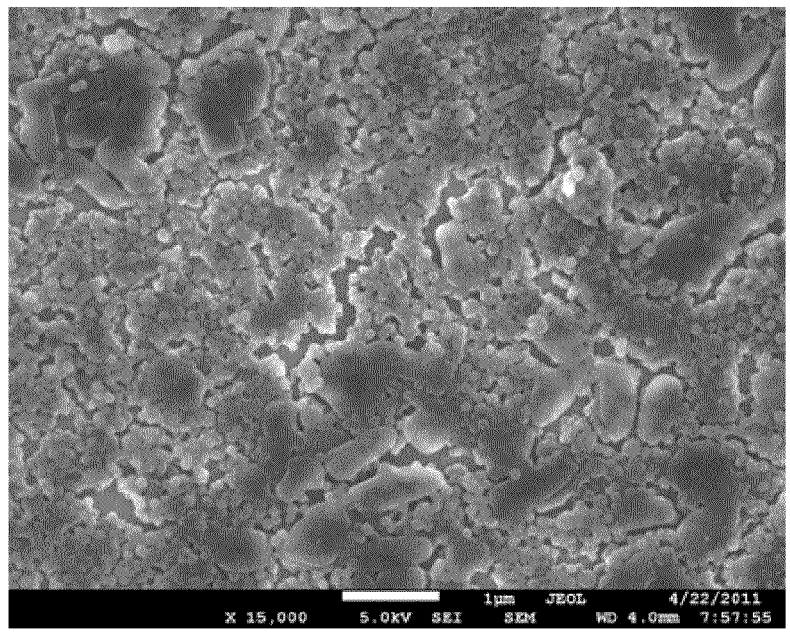

The effect of the volume ratio of DI-water to ethanol on polydopamine spheres formation is illustrated in FIG. 3 depicting the FE-SEM images of PDA spheres obtained at various volume ratios of DI-water to ethanol with the dopamine concentration fixed at 0.5 mg ml$^{-1}$. With the increase in DI-water content, the diameter also increases. Similar to the above result, if the DI-water content is too high, impurities are obtained as shown in FIG. 3D. It suggests that at a given dopamine concentration, monodisperse PDA spheres may be obtained at a certain range of volume ratio of DI-water to alcohol. This provides another way to tune the diameter of PDA spheres.

Figure 4:
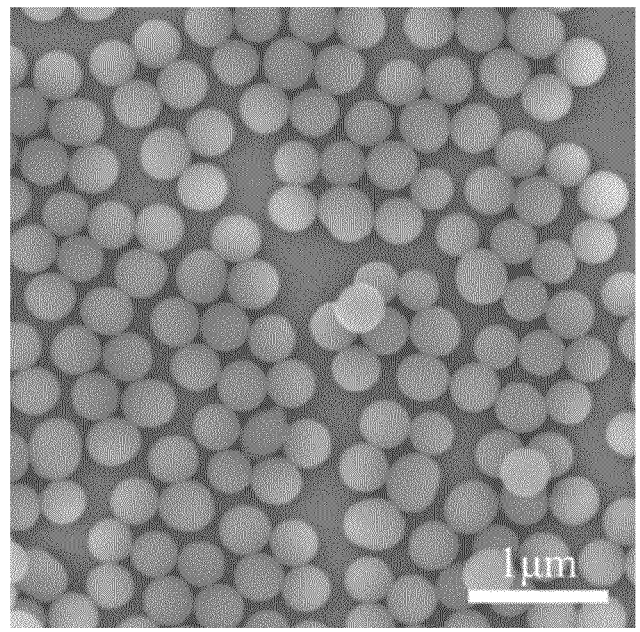
FIG. 4A is a FE-SEM image of PDA spheres synthesized by isopropyl alcohol (IPA) obtained at 1.5 mg ml$^{-1}$ of dopamine with $V_{water}$:$V_{IPA}$=5:2.
FIG. 4B is a FE-SEM image of PDA spheres synthesized by ethylene glycol (EG) obtained at 1.0 mg ml$^{-1}$ of dopamine with $V_{water}$:$V_{EG}$=5:1.
FIG. 4C is a graph showing statistical distribution of the diameters of the PDA spheres shown in FIG. 4A, and the line is the Gaussian fitting curve.
FIG. 4D is a FE-SEM image of a PDA sphere with a hole in the center synthesized by IPA. Scale bar in FIGS. 4A and 4B denotes a length of 1 μm. Scale bar in FIG. 4D denotes a length of 500 nm.
Figure 4:
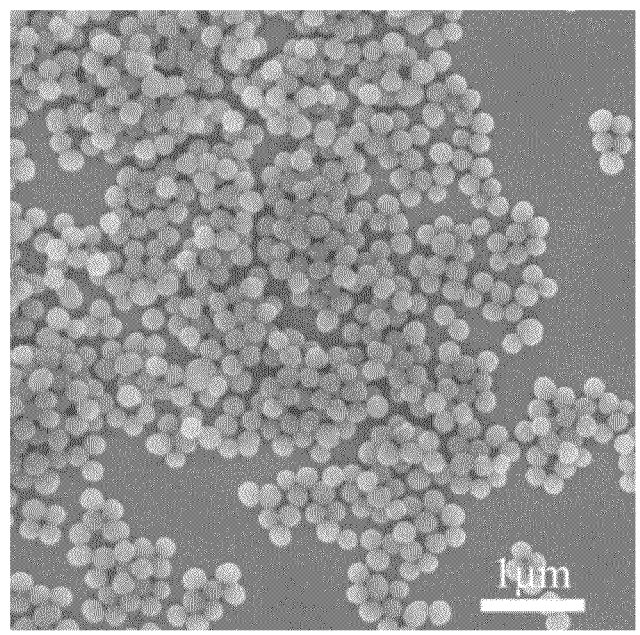
Figure 4:
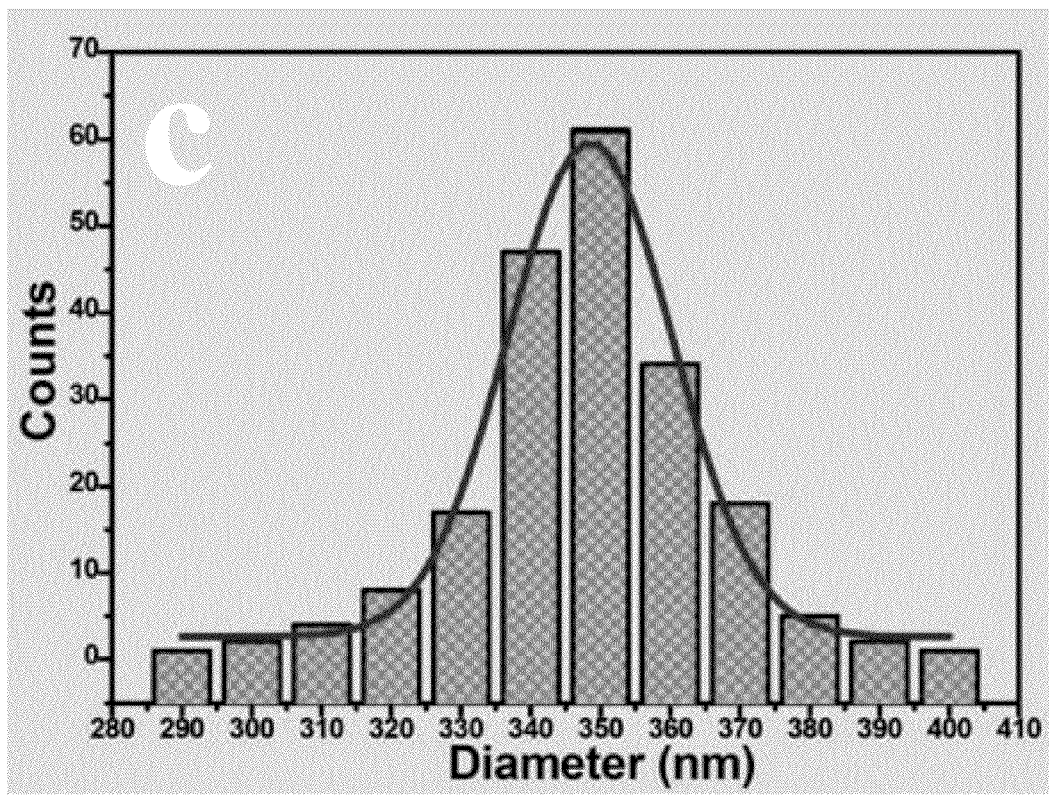
Figure 4:
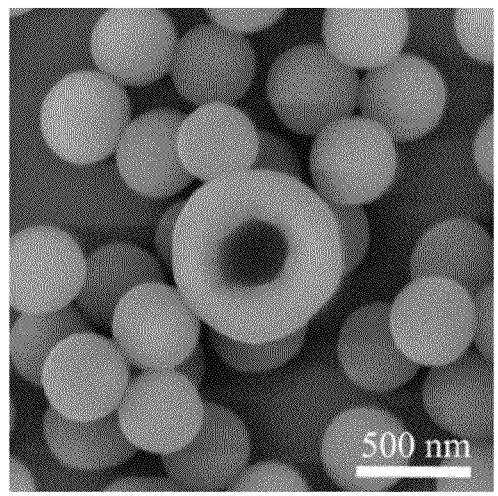

Apart from ethanol, EG and IPA can also be used for the fabrication of PDA spheres. FIGS. 4A and B depict the SEM images of PDA spheres synthesized by EG and IPA, respectively. The PDA spheres fabricated by EG are similar to the one synthesized by ethanol. The PDA spheres obtained by IPA exhibit a better quality. Based on the FE-SEM image observations, the diameters of PDA spheres, which were statistically measured from 200 spheres, displayed a Gaussian distribution with a maximum diameter of 348.5±23.5 nm (6.7%), clearly demonstrating its monodisperse nature (FIG. 4C). It is very important that the PDA spheres may be used as a template for the assembling of nano-architectures, for example, 2D patterns, 3D arrays, and photonic crystals. Interestingly, some PDA spheres with a hole in the center were found occasionally during the FE-SEM observation (FIG. 4D). It is worth to note that all the yield of PDA spheres obtained were able to reach about 50%.

Although polydopamine has been studied for decades, mechanism of the polymerization process is still not clear. Based on the results mentioned above, ethanol (or other alcohol) may prevent the polymerization of dopamine. In the present case, polymerization rate was suppressed by using DI-water and alcohol mixed solution. Polydopamine does not exhibit anisotropic growth character, leading to the formation of spherical polydopamine under a low polymerization rate as shown in FIG. 1E. Other experiment parameters, such as temperature, stirring rate, and supply of oxygen may affect quality of the PDA spheres. As mentioned above, some of the PDA spheres do not assume an ideal sphere-like shape. A better understanding of the growth mechanism may provide insights on achieving high quality PDA spheres.

Figure 5:
FIG. 5 are digital images of (A) PDA spheres dispersed in DI-water, ethanol and dimethyl fumarate (DMF) (arranged in order from left to right); (B) to (D) are images of the PDA spheres (without sonication), where (B) before adding 1 M sulfuric acid ($H_2SO_4$) or 1 M potassium hydroxide (KOH) solution, (C) after adding 1 M $H_2SO_4$ solution, and (D) after adding 1 M KOH solution.
Figure 5:
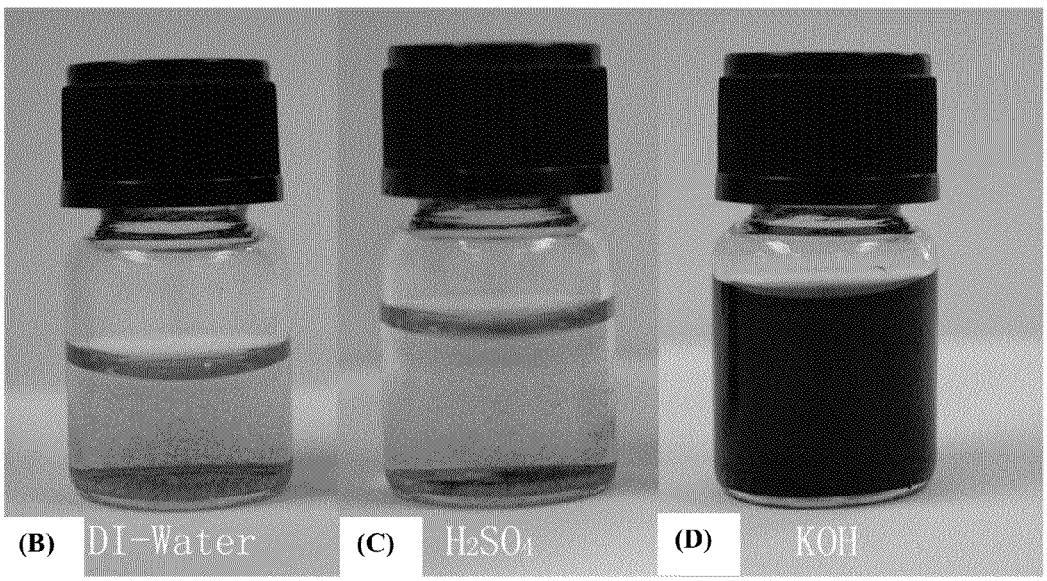

For the practical applications of polymer spheres, the ability of the polymer spheres to be dispersed in various solvents is of high importance as many of the industrial processes are solution based. The as-synthesized PDA spheres exhibited very good dispersion in DI-water, ethanol and N,N dimethylformamide (DMF) as shown in FIG. 5A. It was found that the PDA spheres may be decomposed in KOH solution while remaining stable in $H_2SO_4$ solution as depicted in FIG. 5B to D. This unique property is very useful, as it shows potential of the method to be employed for synthesis of hollow polymer spheres using PDA spheres as a template. In contrast thereto, if PS spheres were used as a template, it could not be removed as both of PS spheres and polymer shell may be dissolved in organic solvents.

Similar to PS spheres, PDA spheres could serve as a general platform for multiple applications. Its unique properties, such as its active surfaces and soluble nature in KOH, make it superior to PS spheres. The active surface groups (—$NH_2$, —OH) on PDA spheres could serve as nucleation sites and linker moieties, making it very simple to synthesize PDA/metal oxides (or metal) core/shell nanostructures, or hollow nanostructures. In the following, selected applications of PDA spheres are presented as proof of concepts.

Example 7

Fabrication of 3D PDA Spheres Arrays

Self-assembly and ordering of monodisperse polymer spheres into arrays and as templates for use in photonic, catalyst supports, and energy storage devices have attracted great attention.

Figure 6:
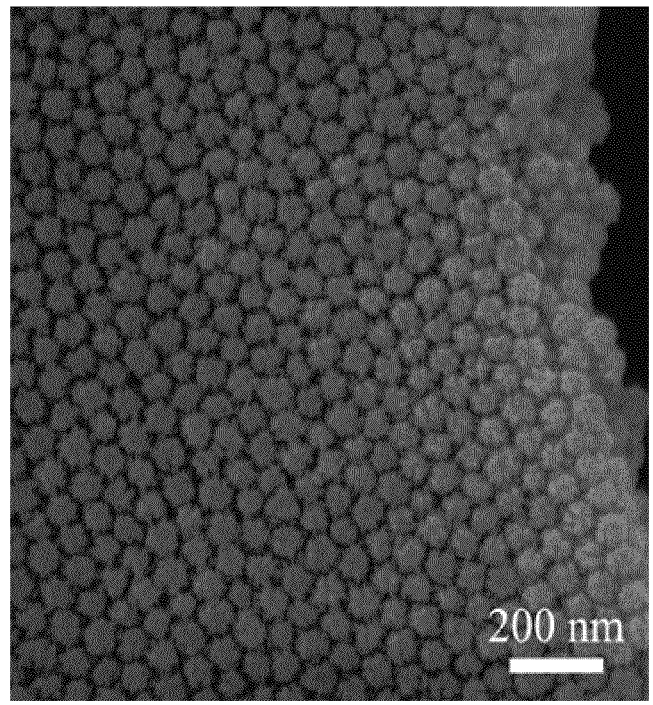
FIG. 6A is a FE-SEM image of a 3D PDA sphere array.
FIGS. 6B and 6C are FE-SEM and TEM images (inset) of the PDA/$Fe_3O_4$ core/shell spheres synthesized without and with EG.
FIG. 6D is a TEM image of the PDA/Ag core/shell spheres.
FIG. 6E is a FE-SEM image of the carbon spheres.
FIG. 6F is a FE-SEM image of the $MnO_2$ hollow spheres and the TEM image (inset) showing the hollow structure.
FIG. 6G is a low magnification FE-SEM image showing the 3D arrays in a larger scale.
Figure 6:
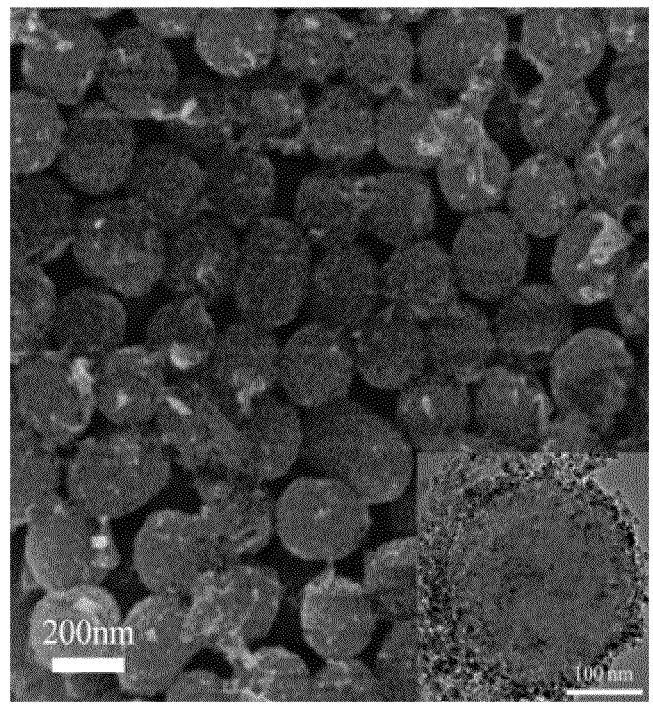
Figure 6:
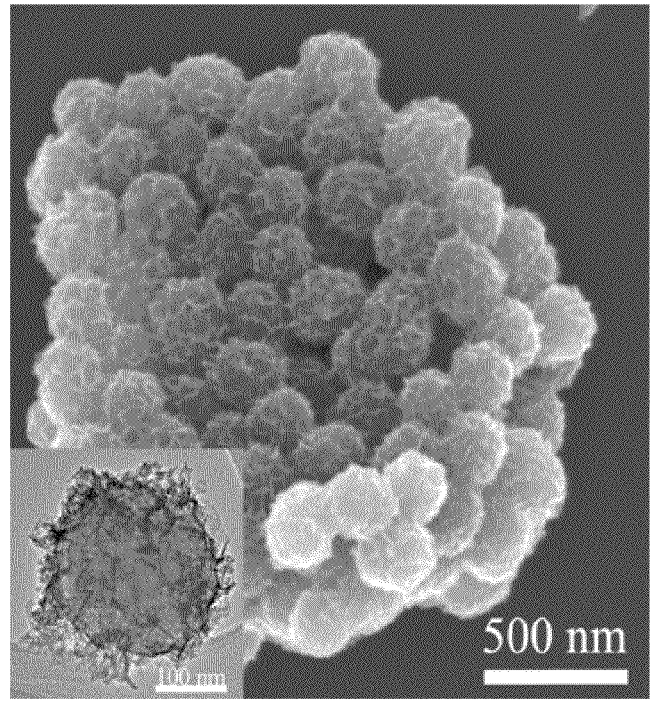
Figure 6:
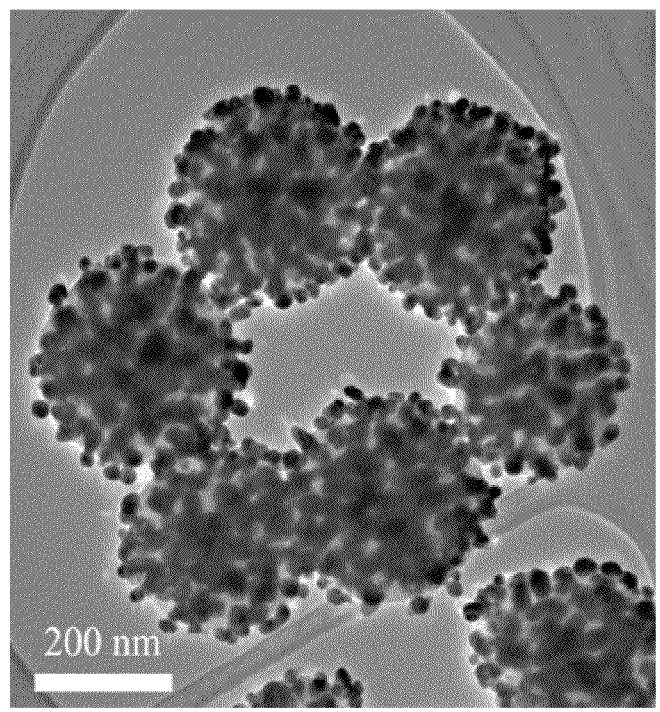
Figure 6:
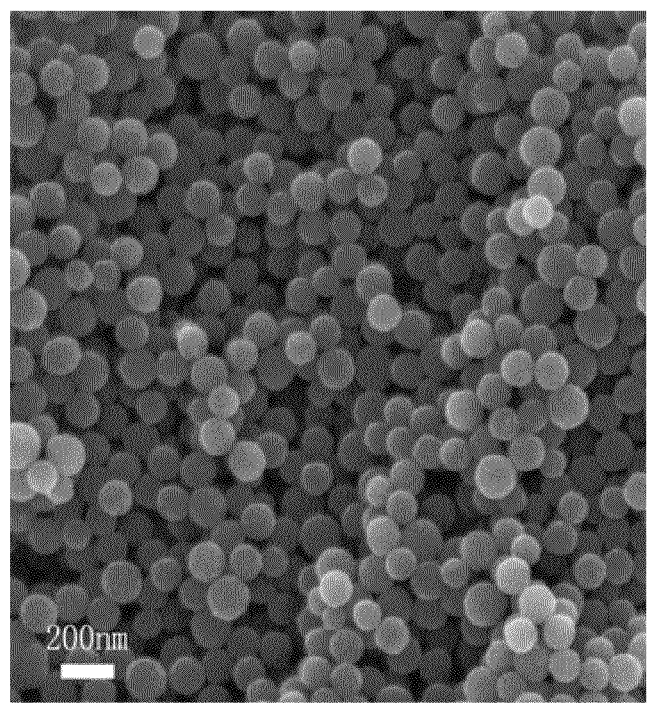
Figure 6:
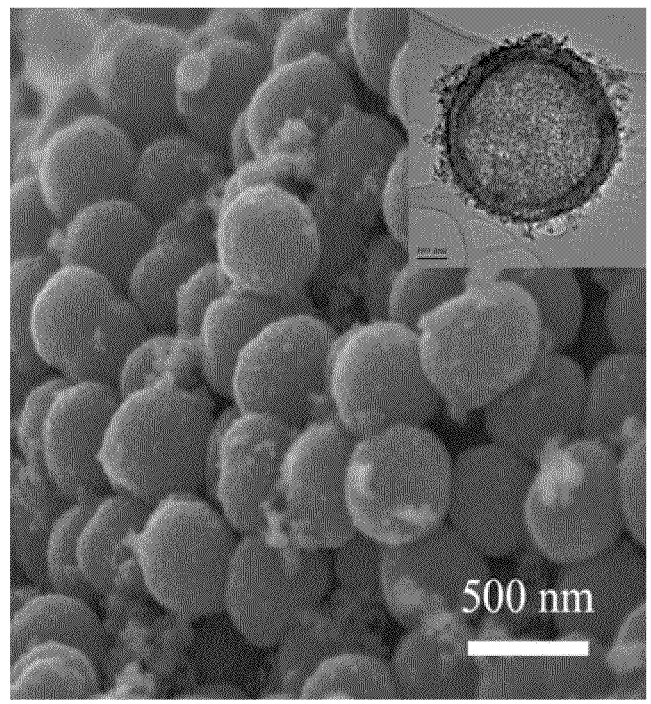
Figure 6:
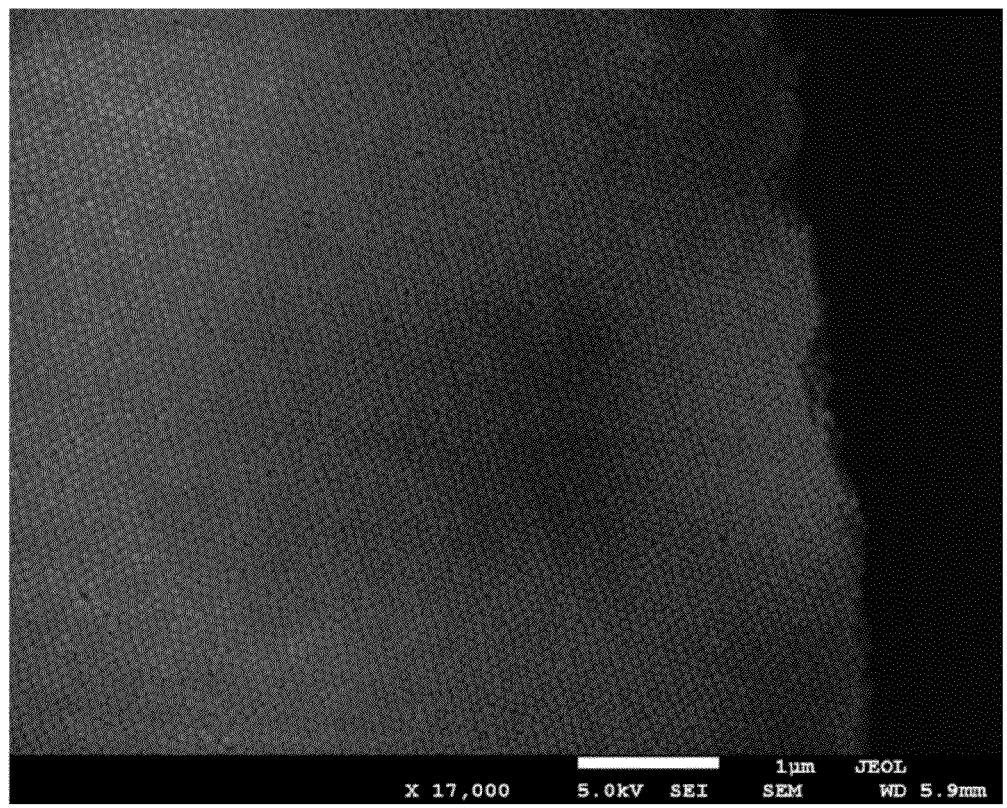

For example, PS spheres are employed as a sacrificial template for fabrication of 2D metal patterning or 3D arrays. Several methods, e.g. sedimentation in a force field, crystallization via repulsive electrostatic interactions, and self-assembly under physical confinement, have been developed to synthesize 3D arrays. In the present case, a simple drop-casting method is used to fabricate 3D PDA spheres arrays. FIG. 6A shows the FE-SEM images of the well ordered PDA spheres arrays with size about 70 nm. Note that the PDA spheres were coated with a thin layer of Au before FE-SEM observation. A low magnification FE-SEM shown in FIG. 6G exhibits the 3D arrays in a larger scale. The size of 3D PDA spheres arrays may be easily tune by using PDA spheres with different diameters. However, "defects" may be present as the 3D arrays are not perfect. Further improvement is ongoing to improve the quality and assembly techniques of the PDA spheres for making the 3D arrays.

Example 8

PDA/$Fe_3O_4$ Core/Shell Spheres for Electrostatic Capacitor

Figure 7:
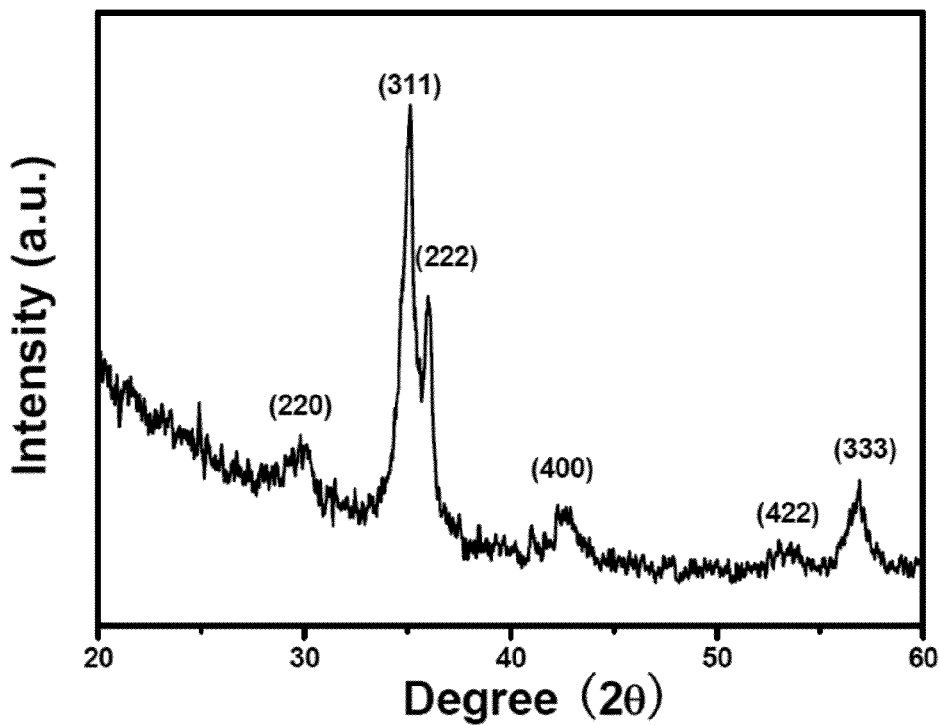
FIG. 7 is X-ray diffraction (XRD) pattern of the PDA/$Fe_3O_4$ core/shell spheres without EG.

In recent years, $Fe_3O_4$ hollow spheres have attracted much attention for use in catalysts, microwave absorption materials, drug delivery systems, and biomolecular materials. Our PDA spheres exhibit superiority in the fabrication of $Fe_3O_4$ shell. Two kinds of PDA/$Fe_3O_4$ core/shell spheres were synthesized by a simple precipitation method without surface functionalization. FIG. 6B illustrates the as-synthesized PDA/$Fe_3O_4$ core/shell spheres. The rough surface suggests the successful coating of $Fe_3O_4$ shell, which comprise of tiny particles with size round several nanometers as depicted by TEM images (inset of FIG. 6B). XRD pattern (FIG. 7) shows that the peaks could be indexed to face-centered $Fe_3O_4$ (JCPDS 74-0748). Interestingly, with the presence of EG, the PDA/$Fe_3O_4$ core/shell spheres show the flower-like morphology (FIG. 6C). The TEM image (inset of FIG. 6D) shows that the $Fe_3O_4$ shell is in the form of thin flakes.

Figure 8:
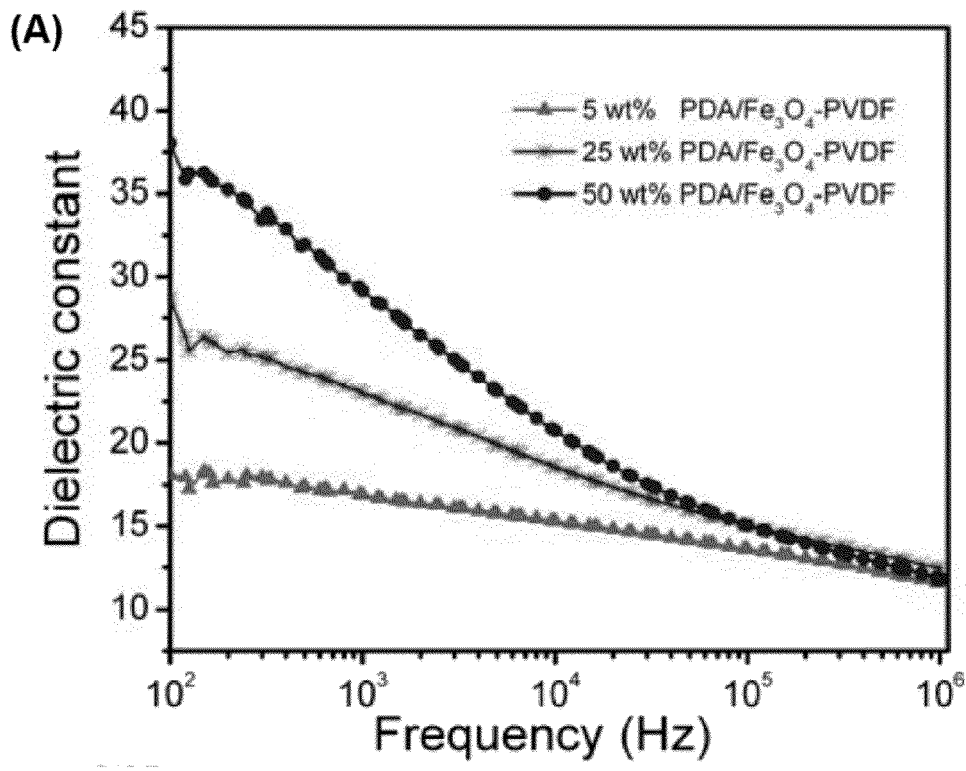
FIG. 8 depicts graphs showing dependencies of (A) dielectric constant, and (B) dielectric loss of PDA/$Fe_3O_4$-PVDF.
Figure 8:
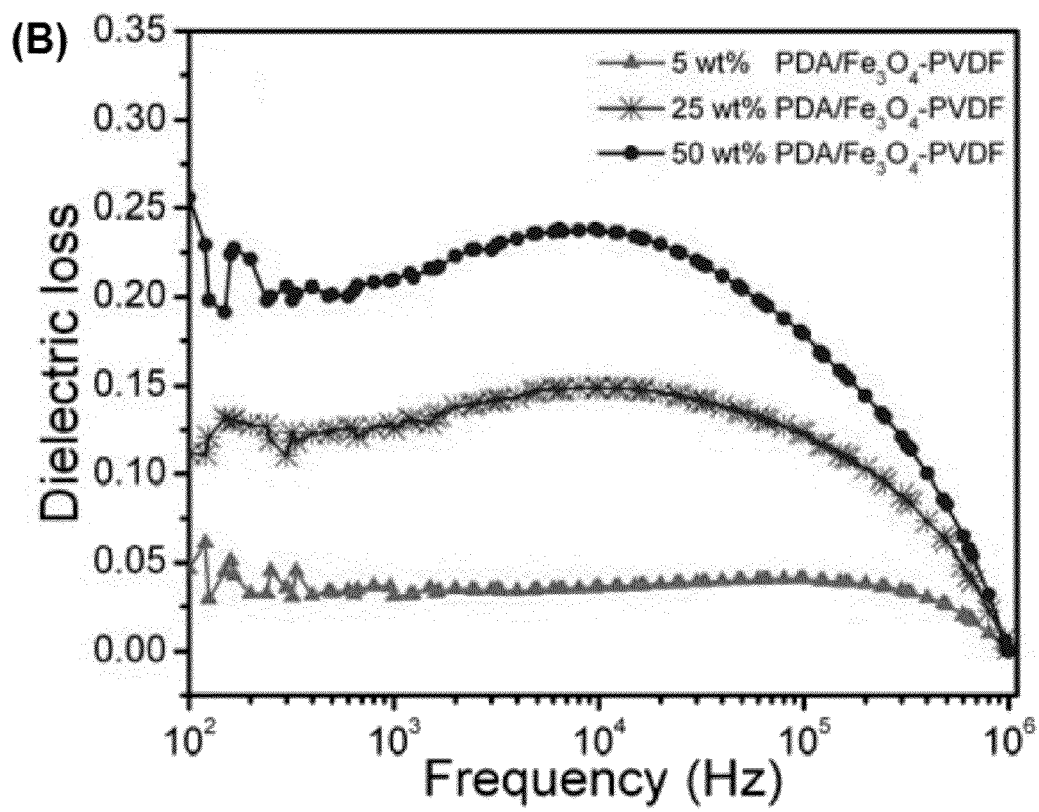

The application of PDA/$Fe_3O_4$ core/shell spheres (without EG) as a filler for electrostatic capacitor was exploited in this work. As the filler has a much higher permittivity than the polymer matrix, most of the increase in effective dielectric permittivity comes though an increase in the average field in the polymer matrix with very little of the energy being stored in the high permittivity filler phase. Herein, $Fe_3O_4$ nanoparticles were used as fillers because its dielectric constant (K=about 20) is close to the PVDF matrix (K=about 10). This prevents the enhanced local field effect leading to low dielectric breakdown strength and poor energy density. To the best of the inventors' knowledge, it has not been studied previously. The performance is revealed in FIG. 8.

FIGS. 8A and 8B display the dielectric constant and dielectric loss for the nanocomposite with various weight percentages of the PDA/$Fe_3O_4$ core/shell spheres as fillers. It can be observed that the dielectric constant of the PDA/$Fe_3O_4$-

PVDF nanocomposite increased with increasing weight of the PDA/Fe$_3$O$_4$ core/shell spheres up to 50 wt %. The dielectric loss increased with increasing weight percentage of PDA/Fe$_3$O$_4$. The dielectric constant of the 50 wt % PDA/Fe$_3$O$_4$-PVDF composites reached as high as 38 at 10$^2$ Hz and 30 at 10$^3$ Hz. This value is comparable to the previously reported value of 40.74 at 10$^3$ Hz for BaTiO$_3$/PVDF composite. The dielectric loss is 0.25 and 0.2 at 10$^2$ Hz and 10$^3$ Hz, respectively. Undoubtedly, these results demonstrate the promising application of PDA/Fe$_3$O$_4$-PVDF nanocomposites for high performance capacitors.

Note that the study of PDA/Fe$_3$O$_4$ core/shell spheres for electrostatic capacitor is at the early stage. Further improvement of the performance is expected.

Example 9

Fabrication of PDA/Ag Core/Shell Spheres

Figure 9:
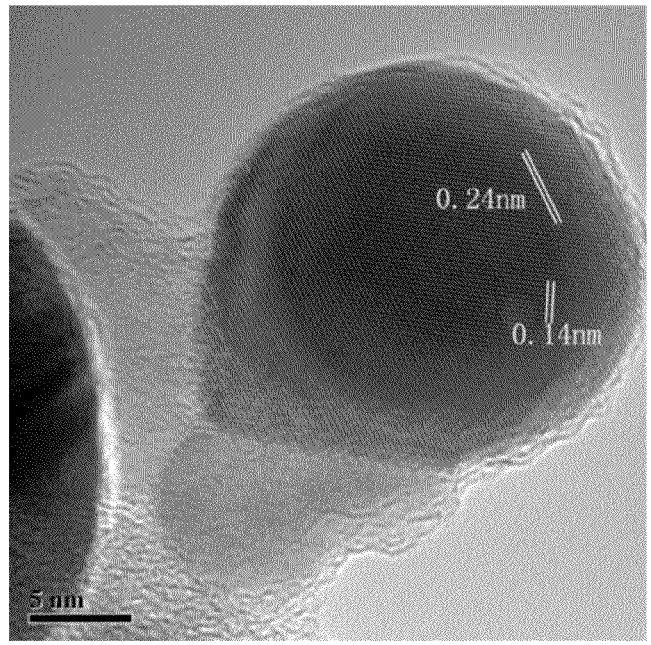
FIG. 9 depicts (A) high resolution transmission electron microscopy (HRTEM) and (B) FESEM image of PDA/Ag core/shell spheres.
Figure 9:
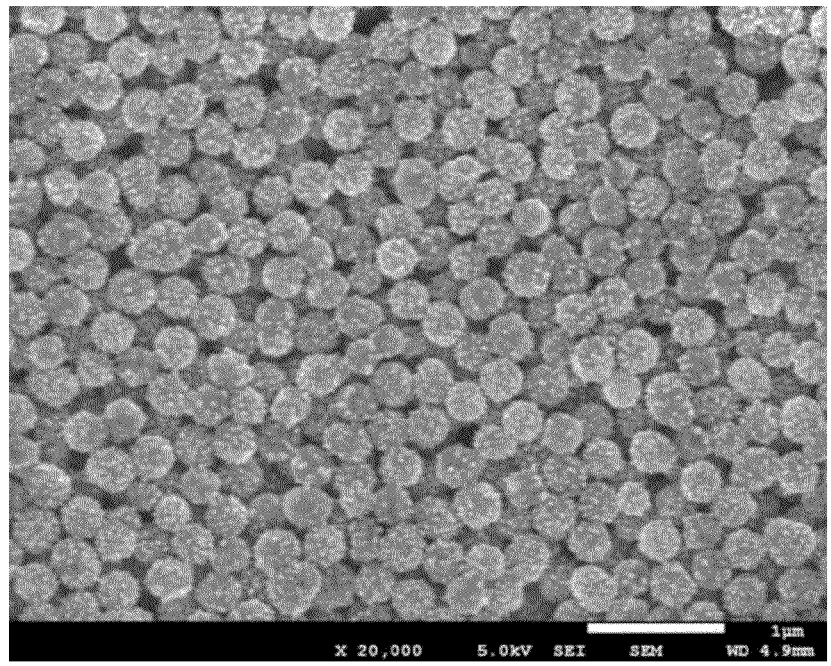

Noble metal based core-shell nanostructures have attracted much attention due to their potential applications in surface-enhanced Raman scattering (SERS), optoelectronics, catalysis, plasmonics, biological sensing, and so forth. In the case of Ag shell, a surface treatment of the solid core (e.g. SiO$_2$ spheres, PS spheres) is required. Another attractive method is the layer-by-layer self-assembly technique developed by Caruso. It could synthesize continuous metallic Ag shell. However, it is too time-consuming for practical application. Using PDA spheres as the core, the synthesis of Ag shell becomes very simple. No surface treatment or complex procedure is required. In brief, the sodium citric solution was first mixed with the PDA spheres suspension. Subsequently, silver nitrate (AgNO$_3$) solution was added to the mixed solution in ice-water bath. After hours of stirring, PDA/Ag core/shell spheres could be obtained. The as-synthesized products were examined by TEM and FE-SEM. FIG. 6D shows the TEM picture of the PDA/Ag core/shell spheres. It can be seen that the Ag shell is composed of high density Ag nanoparticles with size about 10 nm to about 20 nm immobilized on the surface of the PDA spheres. This is further confirmed by the HRTEM examination (FIG. 9A). As shown in FIG. 9A, the marked interplanar d spacings (of about 0.24 and about 0.14 nm) correspond to the {111} and {220} lattice planes of the face-center-cubic Ag, respectively. The low magnification FE-SEM image (FIG. 9B) suggests the high yield of the product. The as-synthesized PDA/Ag core/shell spheres may have application for catalyst and SERS.

Example 10

Fabrication of Carbon Spheres for Supercapacitor

Research in spherical carbon materials is attracting considerable attention for use in supports for catalysts, energy storage devices, fuel cell electrodes, hydrogen storage, and adsorbents due to their excellent conductivity, high thermal stability, low density, high surface area, chemical inertness, and good mechanical stability. Several approaches including chemical vapor deposition, hydrothermal, and template have been developed to synthesize carbon spheres.

Figure 10:
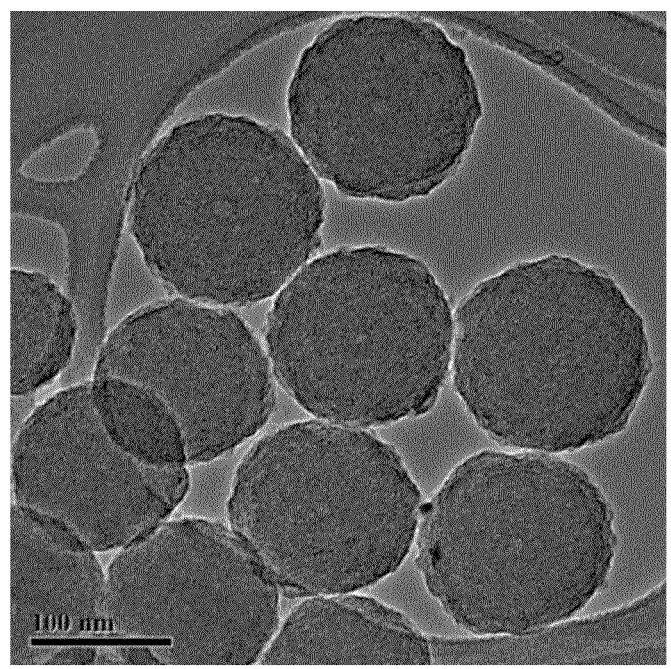
FIG. 10 depicts (A) TEM image and (B) XRD pattern of carbon spheres.
Figure 10:
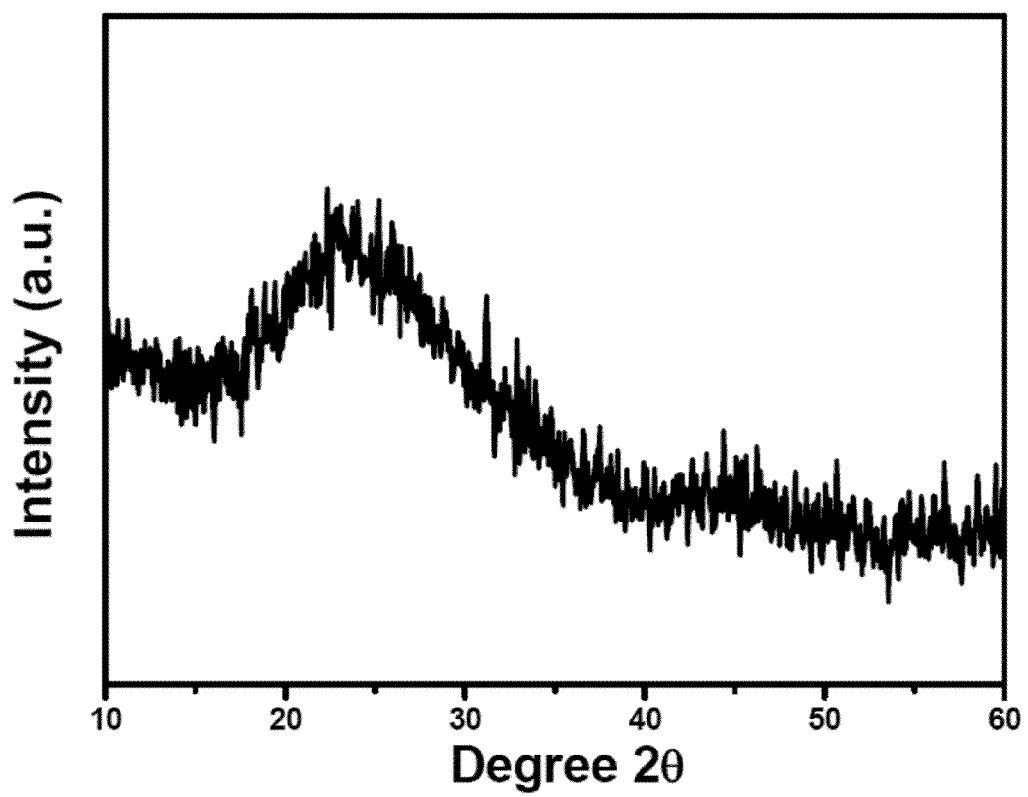

The template method is attractive since it allows better control of the size, pore structure and morphology of the resulting carbon materials. However, it requires templates removal by etching in a great deal of corrosive media, causing pollution to the environment. Our PDA spheres show superiority in the fabrication of carbon spheres. PDA spheres can be converted to carbon spheres simply by a carbonated process under 900° C. under vacuum. PDA spheres serve as template as well as the carbon source and no protection shell is required. Furthermore, due to the low cost synthesis of PDA spheres, the carbon spheres could be fabricated in large scale resulting in cost cutting. FIG. 6E depicts the FE-SEM image of the as-synthesized carbon spheres. It is seen that all carbon particles displayed a spherical morphology of diameter around 120 nm as revealed in the TEM image (FIG. 10A). The carbon spheres were well separated without apparent aggregation. The XRD pattern (FIG. 10B) suggests that the carbon spheres are poorly graphitic.

Figure 11:
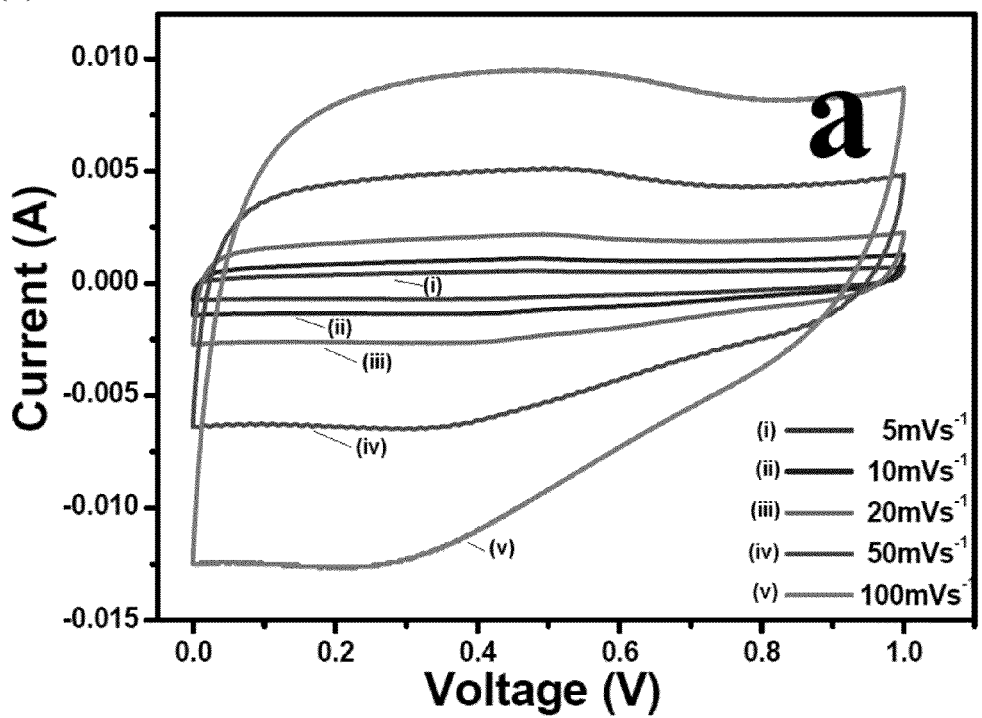
FIG. 11 depicts capacitive behavior of the carbon spheres.
Figure 11:
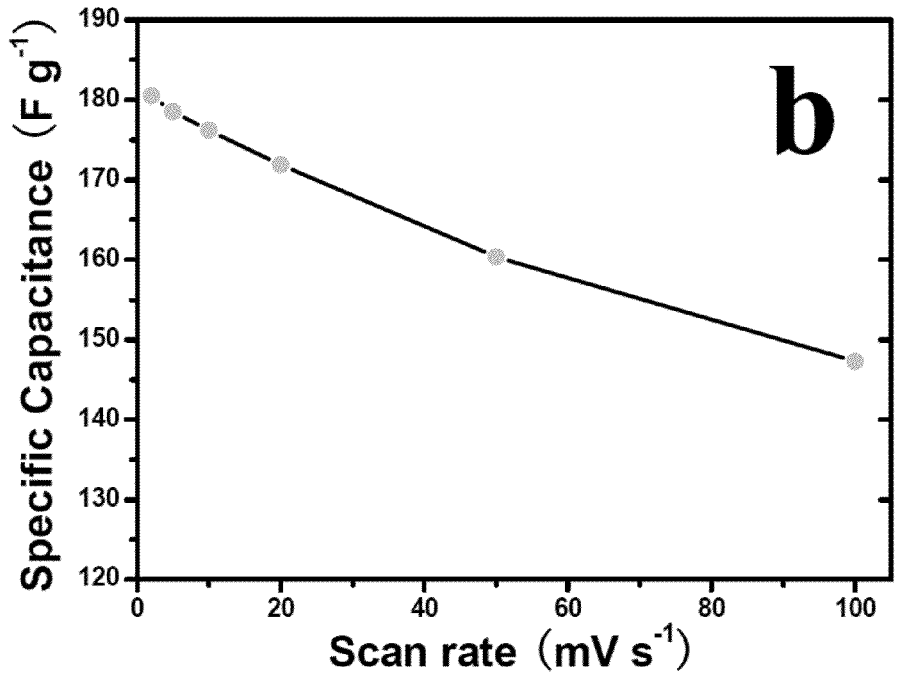
Figure 11:
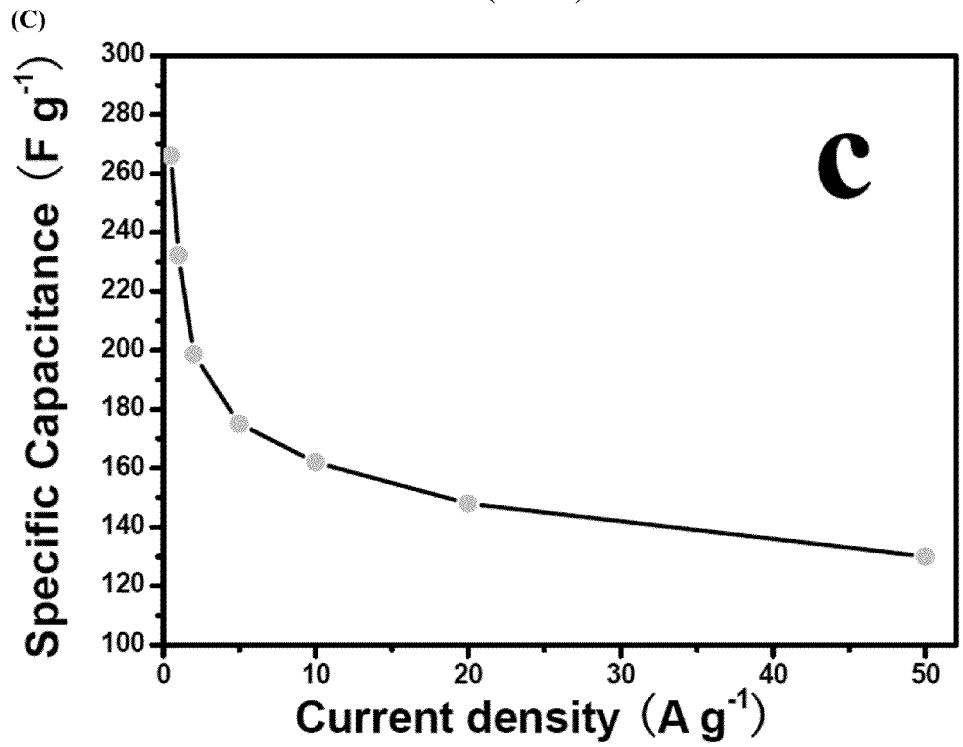

The capacitive behavior of the carbon spheres was studied. The results are shown in FIG. 11. The loading density was found to be 0.56 mg cm$^{-2}$. FIG. 11A shows the cyclic voltammogram (CV) obtained at various scan rates. Specific capacitance reaches 179 F g$^{-1}$ at 5 mV s$^{-1}$ and remains 82% at 100 mV s$^{-1}$ suggesting good rate capability (FIG. 11B). FIG. 11C exhibits the specific capacitance obtained at various current densities. At 0.5 A g$^{-1}$, a high specific capacitance of 266 F g$^{-1}$ is achieved. At a high current density of 50 A g$^{-1}$, the specific capacitance still remains at 130 F g$^{-1}$, corresponding to a power density of 25 kW kg$^{-1}$ (based on carbon spheres) and energy density of 18 Wh kg$^{-1}$, respectively. It demonstrates the good rate capability compared with previous reported results. These results suggest that the as-synthesized carbon spheres are promising supercapacitor electrode material.

Example 11

Fabrication of MnO$_2$ Hollow Spheres and its Application for Supercapacitor

Hollow nanostructures are widely used in catalysts, chemical sensors, photonics, energy storage, and drug delivery. Template method, yielding products with narrow size distribution, is one of the most embarked strategies to synthesize hollow structures.

However, the commonly used templates, like PS spheres, are surface inactive resulting in problems to fix desired materials on the template surface. Our PDA spheres with active surface could conquer this drawback. Herein, we present a very simple method to fabricate MnO$_2$ hollow spheres for demonstration. By simply adding KMnO$_4$ solution to the PDA spheres suspension in the presence of H$_2$SO$_4$ solution, MnO$_2$ hollow spheres may be obtained after removing the PDA spheres core by KOH.

Figure 12:
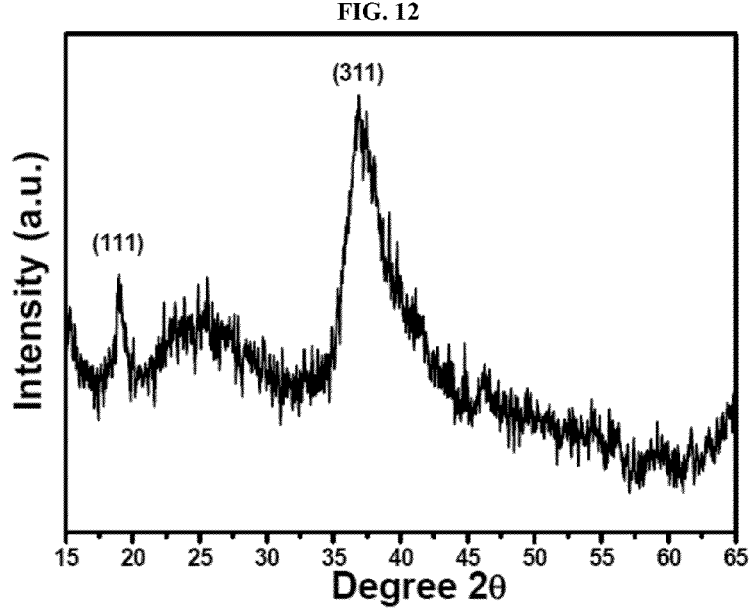
FIG. 12 is a graph showing XRD pattern of the $MnO_2$ hollow spheres.

The reaction is very fast, which may be completed within several minutes. Not only do the PDA spheres act as a template, they also serve as reducing reactants. Although detailed reaction is still not clear, it may be similar to previous report using organic reducing reactant for the synthesis of MnO$_2$. The XRD pattern (FIG. 12) shows two characteristic peaks (111) and (311), at 19 and 37, which were confirmed to be MnO$_2$ (JCPDS 44-0992). The weak and broad peak signals suggest the sample is poorly crystalline.

Figure 13:
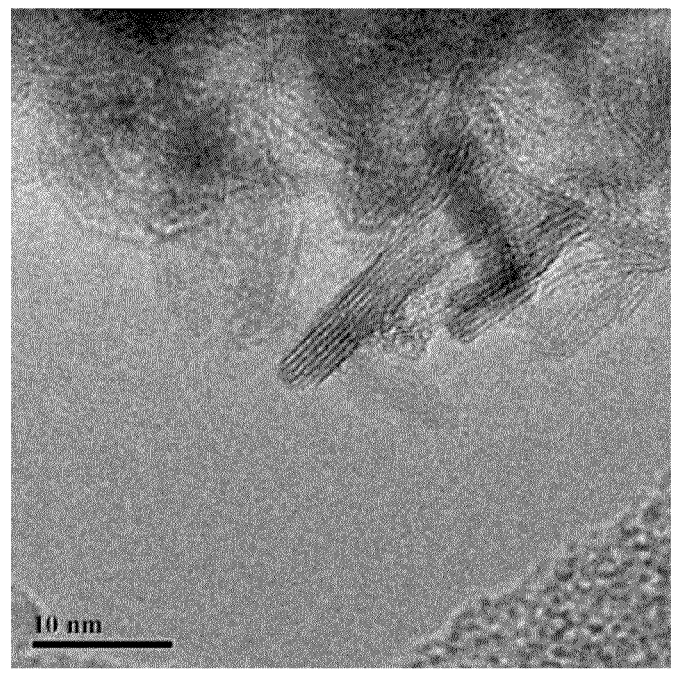
FIG. 13 shows HRTEM image of the manganese (IV) oxide ($MnO_2$) shell.
Figure 14:
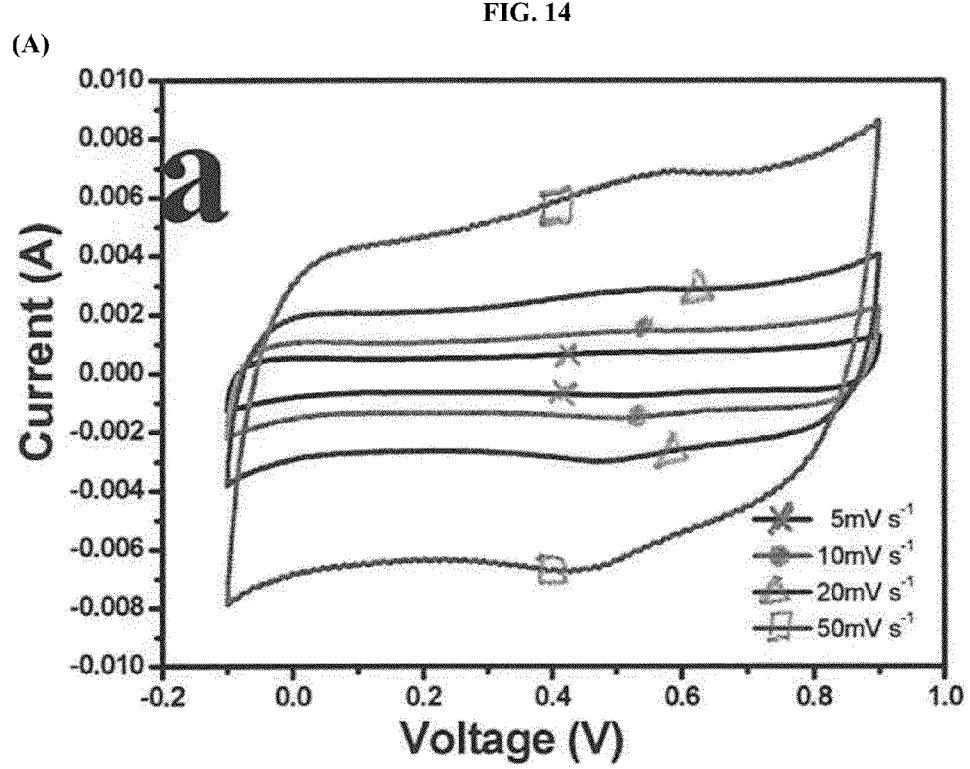
FIG. 14 depicts graphs showing capacitive behavior of the hollow $MnO_2$ spheres.
Figure 14:
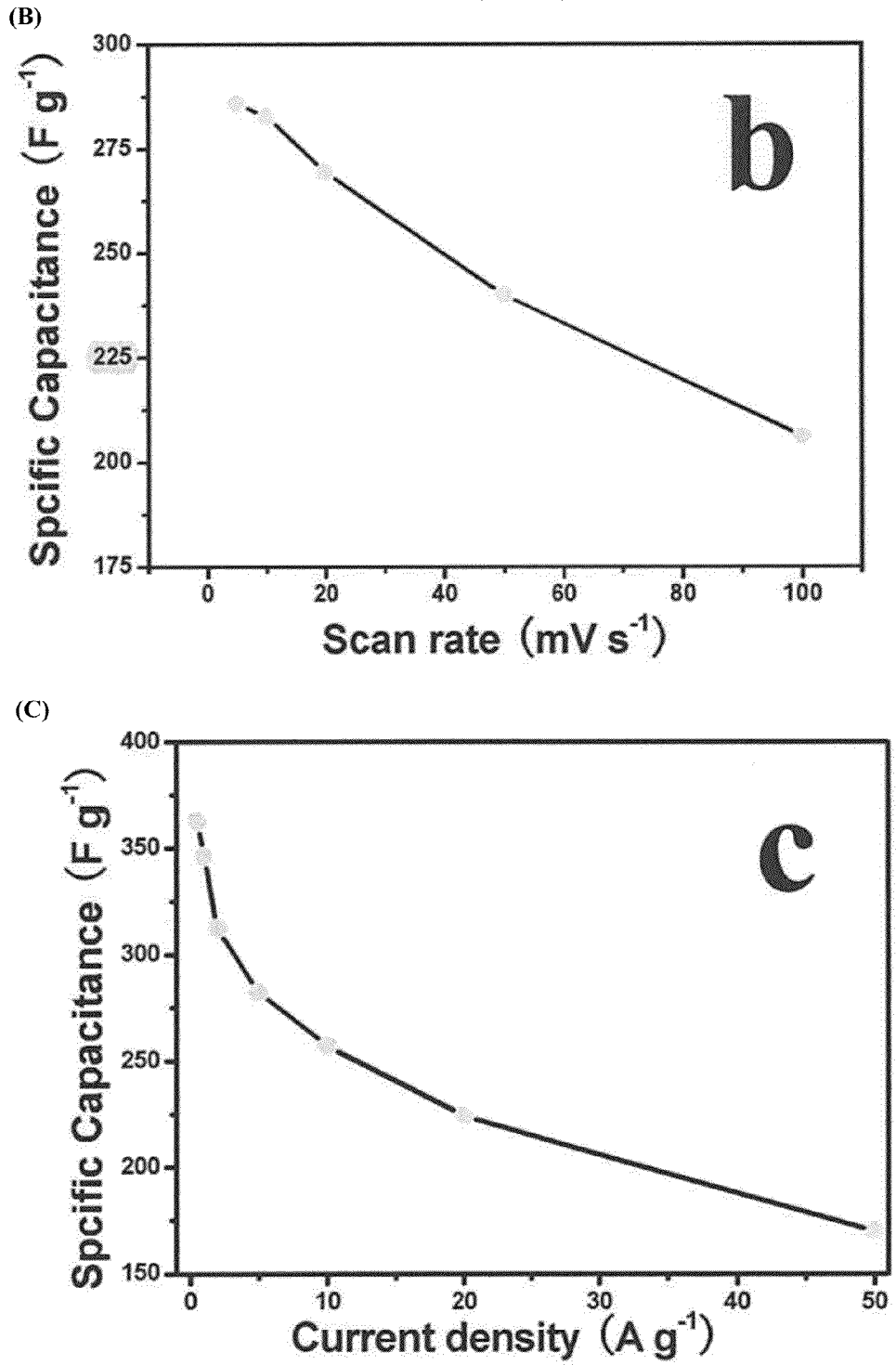
Figure 14:
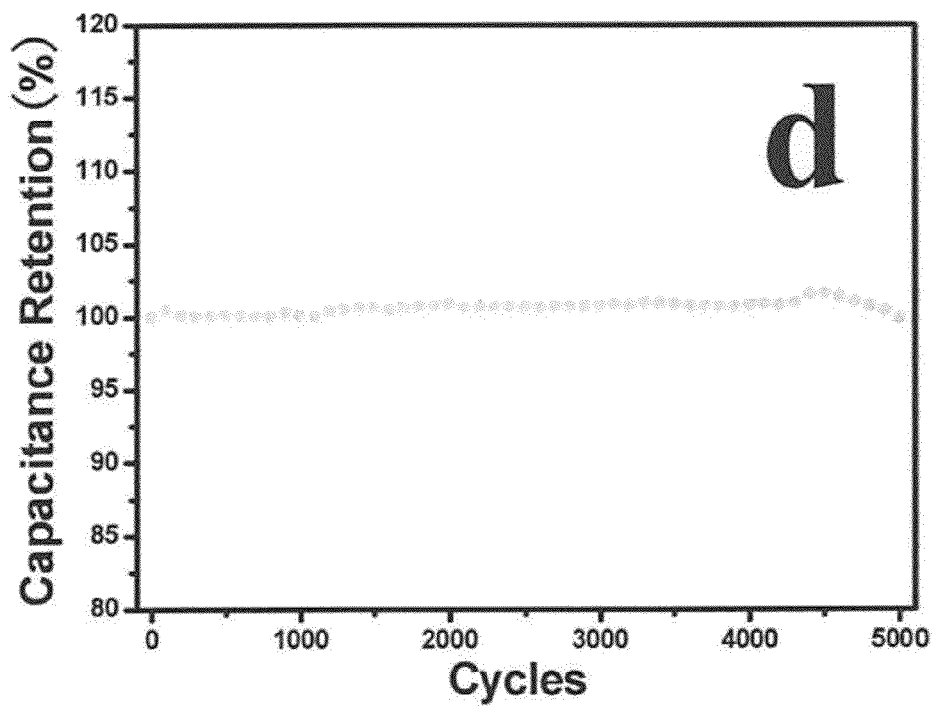
Figure 15:
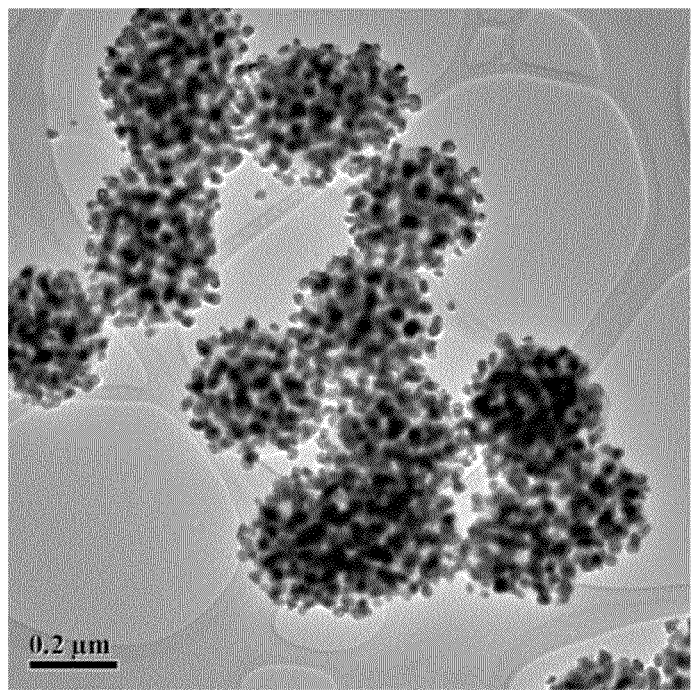
FIG. 15 depicts (A) TEM image of the polydopamine spheres/Ag core/shell structures; (B) TEM image of the $MnO_2$ hollow spheres; (C) TEM image of the polydopamine spheres/$Fe_3O_4$ core/shell structures obtained with ethylene glycol; (D) the TEM image of the polydopamine spheres/$Fe_3O_4$ core/shell structures obtained without ethylene glycol.
Figure 15:
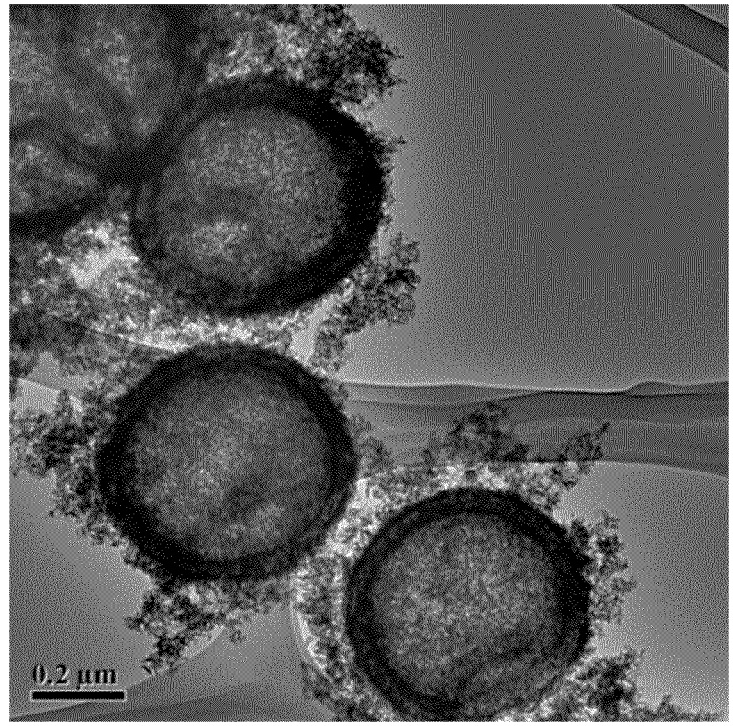
Figure 15:
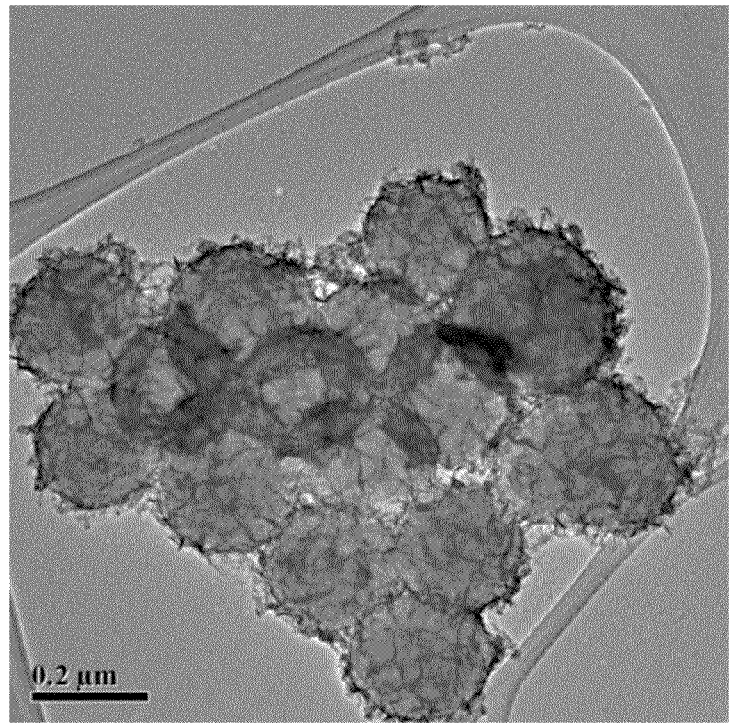
Figure 15:
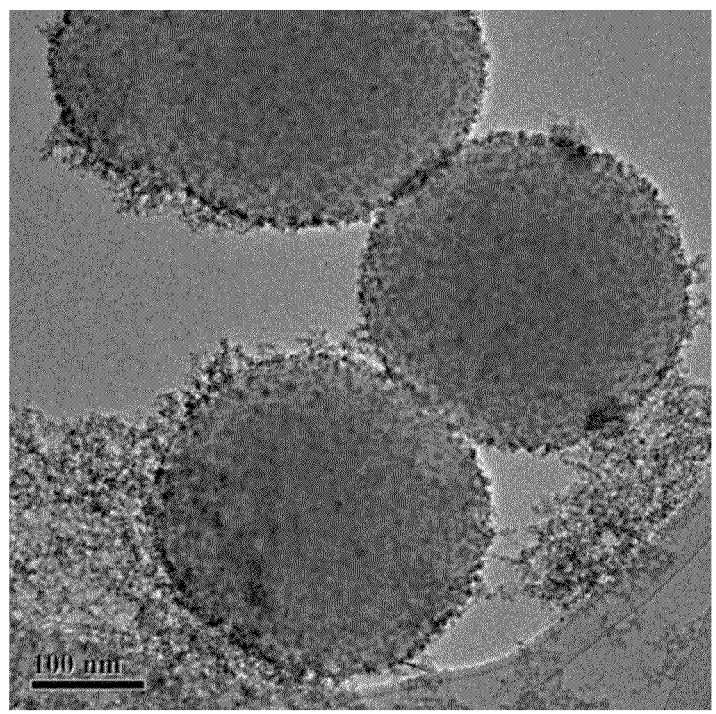
Figure 16:
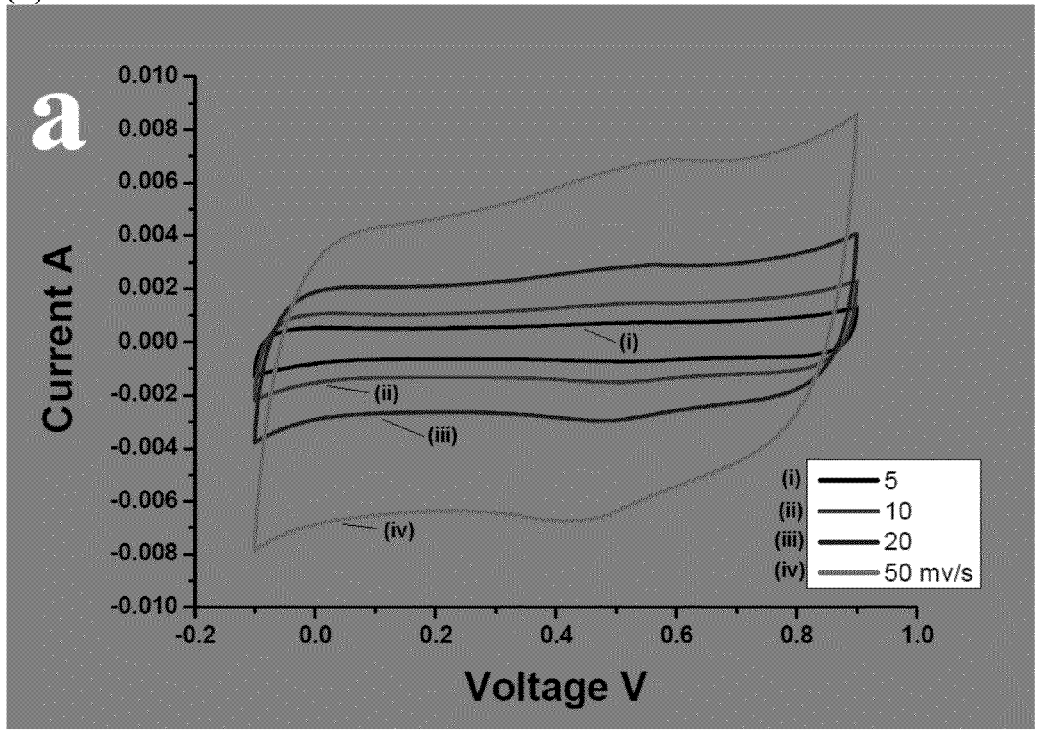
FIG. 16 depicts graphs showing capacitive performance of $MnO_2$ hollow spheres. (A) CV curves obtained at different scan rates, loading density 0.417 mg/cm$^2$; (B) plot of the specific capacitance as a function of scan rate at various loading densities; (C) specific capacitance obtained at various current densities, loading density 0.417 mg/cm$^2$; (D) plots of the specific capacitance of $MnO_2$ hollow spheres and control sample ($MnO_2$ hierarchical spheres) as a function of loading densities; (E) plotted curve of the variation in the specific capacitance of the $MnO_2$ hollow spheres as a function of the cycle number.
Figure 16:
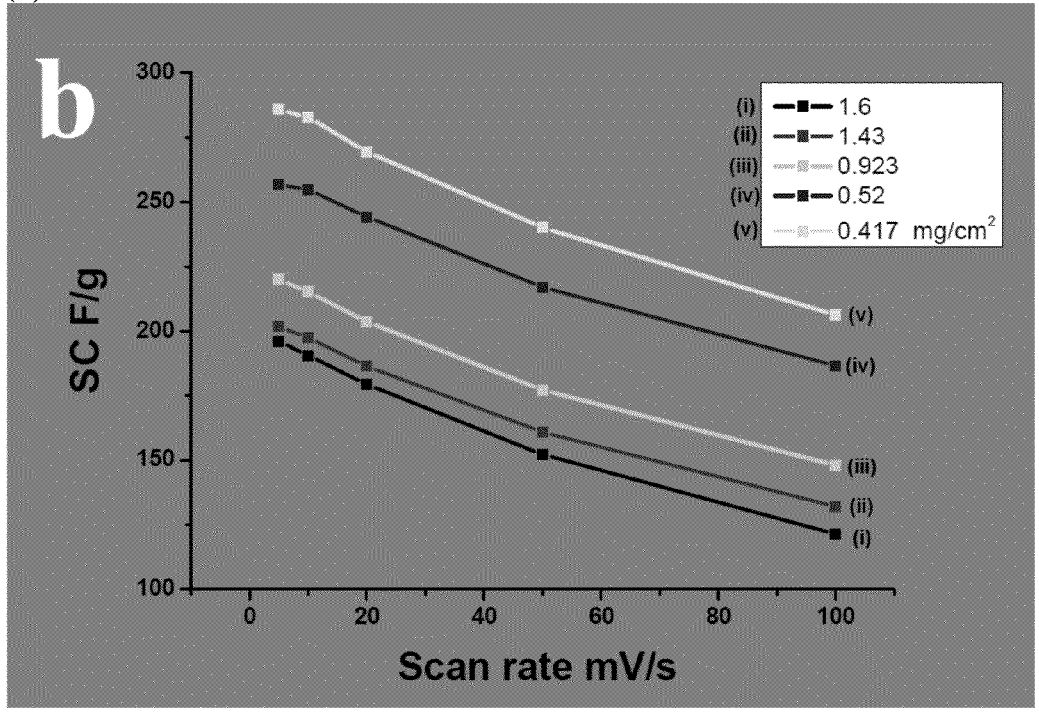
Figure 16:
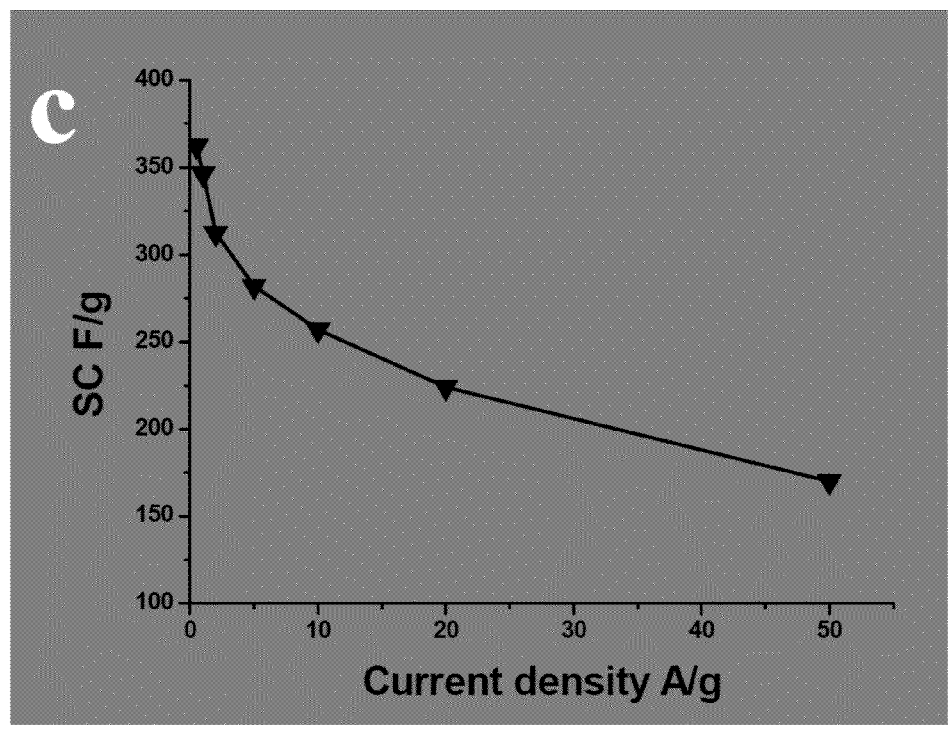
Figure 16:
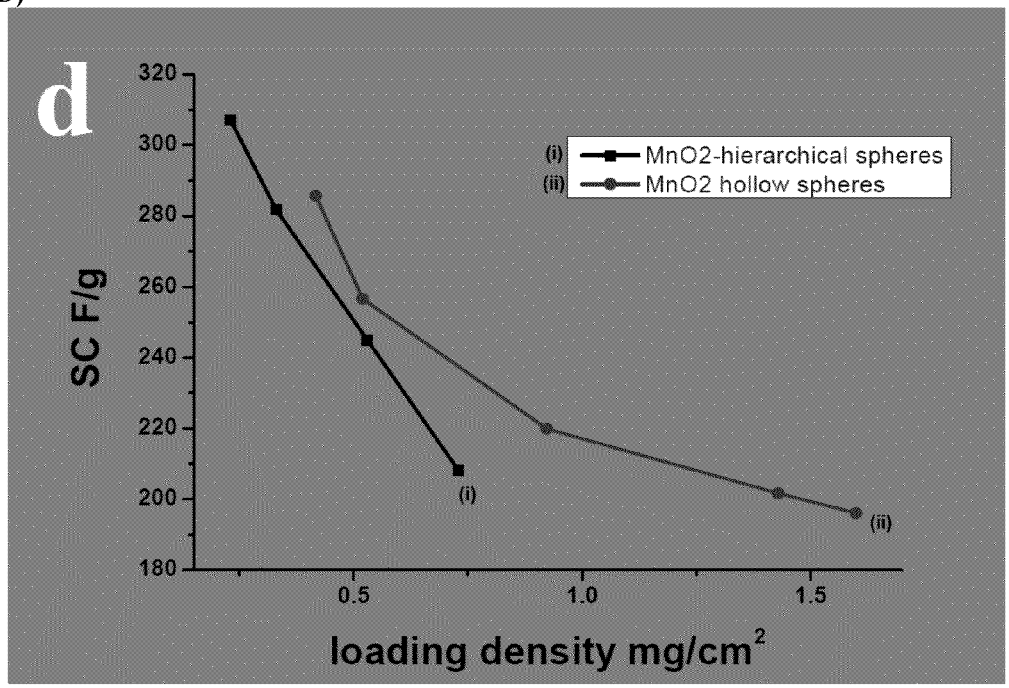
Figure 16:
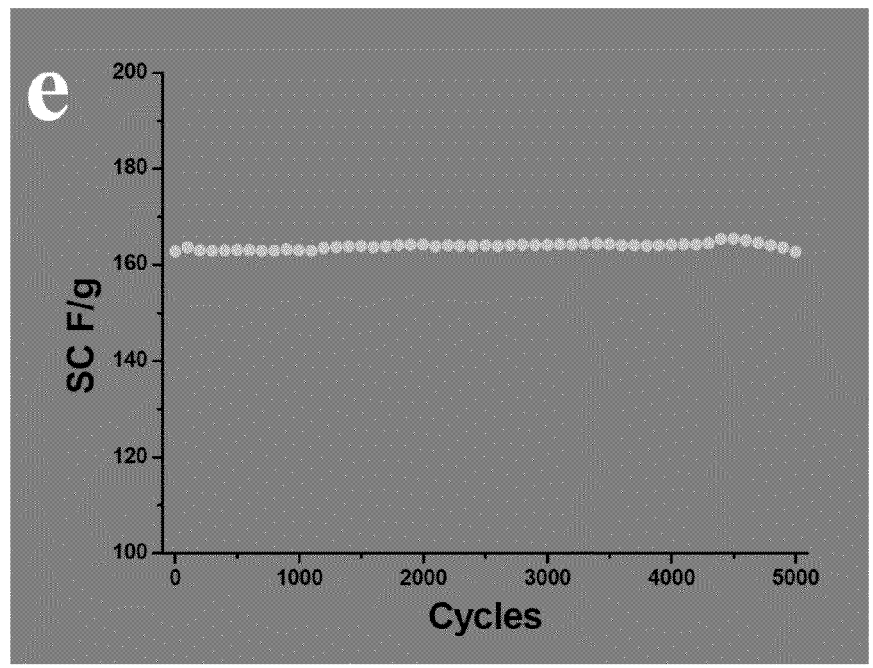

The as-synthesized MnO$_2$ hollow spheres are shown in FE-SEM image (FIG. 6F). More clearly, the hollow structure is revealed by the TEM image (inset of FIG. 6F). The MnO$_2$ shell is composed of small crystals as shown in HRTEM image (FIG. 13). The size and shell thickness of MnO$_2$ hollow spheres may be easily controlled by PDA spheres diameter and the ratio of KMnO$_4$ to PDA spheres respectively. MnO$_2$ is a very promising pseudocapacitive material for supercapacitor due to its environmental friendliness, high safety, and good efficiency. The as-synthesized MnO$_2$ hollow spheres were studied as electrode material and showed enhanced performance due to the hollow structure. The hollow core could serve as reservoir for electrolyte, which could improve the rate capability. The results are shown in FIG. 14. FIG. 14A shows the CV curves at various scan rates, which exhibit ideal box-like shape. At a loading density of 0.417 mg cm$^2$, the capacitance reaches as high as 286 F g$^{-1}$ at 5 mV s$^{-1}$. At high scan rate (100 mV s$^{-1}$), the capacitance remains about 72% of this value indicating a good rate capability (FIG. 14B). The specific capacitance obtained by galvanostatic charge/discharge method reaches 363 F g$^{-1}$ at 0.5 A g$^{-1}$ and 170 F g$^{-1}$ (23.6 Wh kg$^{-1}$) at 50 A g$^{-1}$ (25 kW kg$^{-1}$, based on MnO$_2$) as shown in FIG. 14C, clearly demonstrating the good rate capability. This improvement could be attributed to the unique hollow structure. In addition, the MnO$_2$ hollow spheres electrode shows excellent cycling stability tested by repeating CV measurement up to 5000 cycles without capacitance degradation as shown in FIG. 14D.

Example 12

Electrochemical Characterization

The MnO$_2$ hollow spheres (or carbon spheres) electrodes were prepared by casting a mixture of 80 wt % of the active material with 15 wt % of carbon black and 5 wt % of polyvinylidenefluoride binder (PVDF), dissolved in N-methylpyrrolidone (NMP) on a graphite paper followed by drying at 100° C. for 12 hours.

Electrochemical measurements were carried out using an electrochemical analyzer (Autolab Potentiostat, PGSTAT302N). The three-electrode cell consisted of Ag/AgCl as the reference electrode, Pt as the counter electrode and the as-synthesized sample as the working electrode. 1 M Na$_2$SO$_4$ (or 1 M H$_2$SO$_4$ for carbon spheres) aqueous solutions with different concentrations were served as electrolyte at room temperature.

Cyclic voltammetry (CV) was done at different scan rates of 5, 10, 20, 50 and 100 mV s$^{-1}$. Galvanostatic charge/discharge curves were measured at different current densities of 1, 2, 5, 10, 20 and 50 A g$^{-1}$ to evaluate the power density and energy density. The potential window in the range of −0.1 V to 0.9 V (0 V to 1 V for carbon spheres) was used in the measurements.

Example 13

Electrostatic Capacitor Characterization

PDA/Fe$_3$O$_4$ nano-powders were sonicated after adding N,N dimethylformamide (DMF) to prevent agglomeration. PVDF was dissolved in DMF at room temperature. After the solution became transparent, PDA/Fe$_3$O$_4$ solution was added. The solution was stirred overnight. The thin film was drop-coated onto a clean glass slide and dried at 60° C. The film thickness of about 20 μm was used in this investigation. Platinum electrodes were sputtered on both sides of the samples for testing the electrical properties. Frequency-dependent capacitance and loss tangent were measured using an Agilent E4980A.

In summary, a facile, low cost, and green method has been developed to synthesize monodisperse PDA spheres. The diameter PDA spheres, ranging from tens to hundreds of nanometers, may be simply tuned by the concentration of dopamine together with the volume ratio of DI-water to alcohol. More importantly, PDA spheres possess active surface. It provides superiority to fabricate various nanostructures (e.g. metal oxides hollow spheres, core/shell structures, and carbon spheres), some of which exhibit good performance for energy storage devices. Similar to PS spheres, PDA spheres could also be used for 2D patterning and 3D arrays. Undoubtedly, PDA spheres create a new general platform for not only fundamental research but also for various practical applications. The designed synthesis of PDA spheres in this report fuels further understanding of their growth, properties and applications which are on-going efforts.

Example 14

Figure 17:
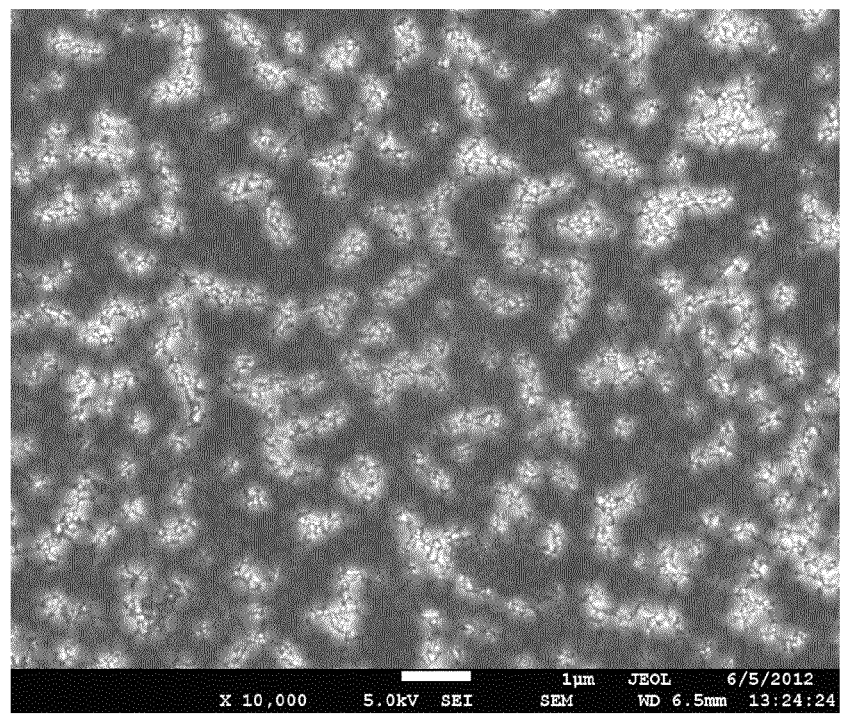
FIG. 17 is (A) SEM image of PDA/ITO substrate; UV spectrum of the two samples, (B) pristine tungsten oxide ($WO_3$) film, (C) annealed sample at 400° C.; (D) dynamic optical modulation of the electrochromic $WO_3$ on PDA/ITO (annealed at 400° C.) films and $WO_3$ electrochemical deposited on ITO (annealed at 400° C.) subjected to an externally applied potential of −3V (coloration) and +3V (decoloration).
Figure 17:
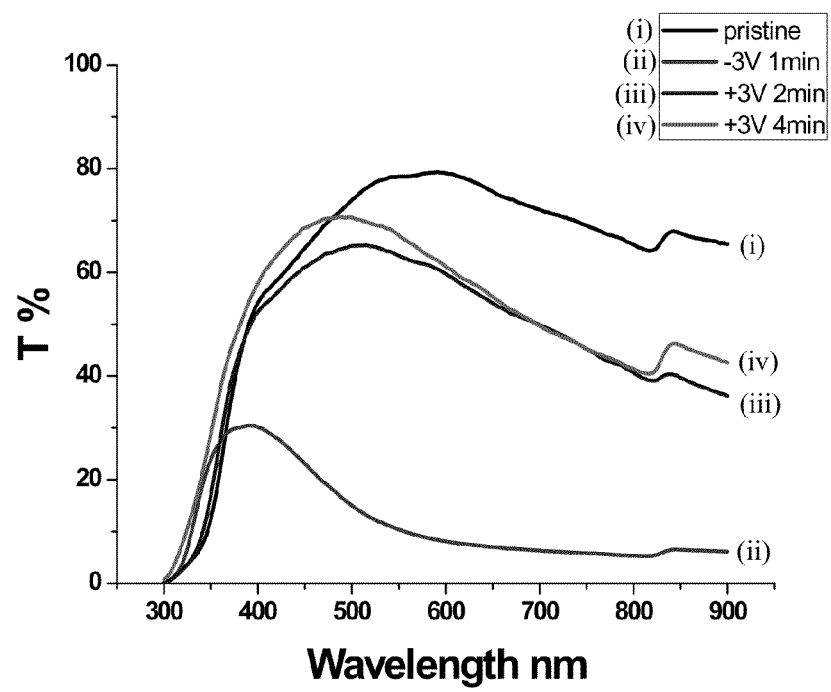
Figure 17:
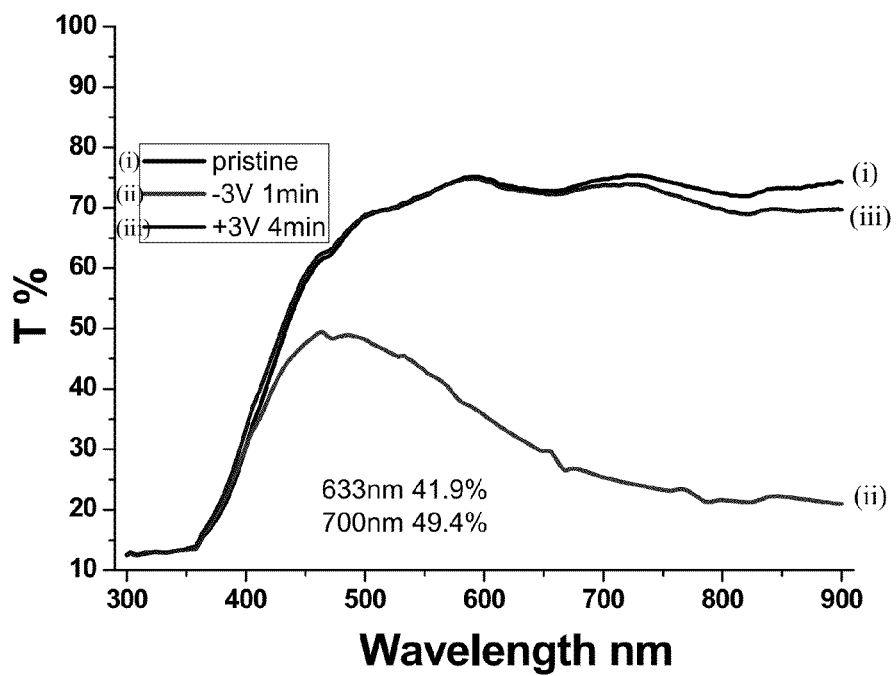
Figure 17:
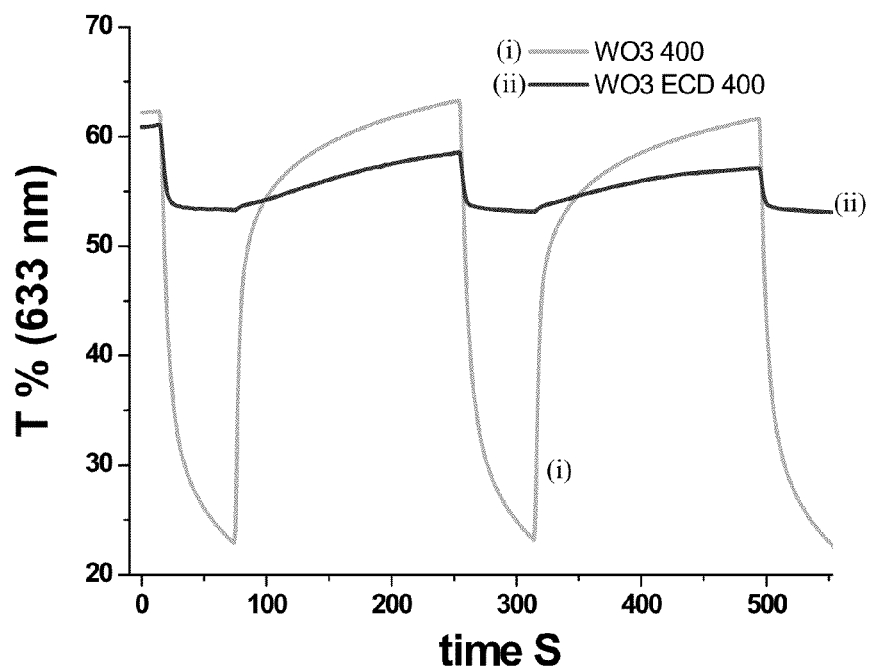

Electrochromic Performance of Porous Tungsten Oxide (WO$_3$) Film Using PDA Spheres Template Monolayers of PDA spheres were coated on ITO glass substrates modified with PVP (8 wt %). Subsequently, WO$_3$ films were electrochemical deposited on the PDA/ITO glass substrates at −0.8 V using WO$_3$ solution (FIG. 17A). The WO$_3$ solution was prepared by adding tungsten powder to 30 ml of 31% hydrogen peroxide (H$_2$O$_2$) under stifling for 2 hours, after which 20 ml of isopropyl alcohol or ethanol was added.

As to the electrocheromic (EC) performance, two kinds of samples were tested, namely, as-synthesized WO$_3$ film on PDA/ITO substrate, and annealed WO$_3$ film at 400° C. for 3 hours in air. The pristine sample shows the highest contrast with about 65.8% at 700 nm (see FIG. 17B). However, it could change back to the original state. And the transparence of light with long wavelength is suppressed possibly due to PDA spheres. The PDA spheres may be removed when the sample annealed at 400° C. The contrast could reach about 49.4% at 700 nm (see FIG. 17C). The transparence could change back after add +3 V for 4 mins, indicating a good performance. The dynamic optical coloring/bleaching characteristics of the electrochromic WO$_3$ on PDA/ITO (annealed at 400° C.) films and WO$_3$ electrochemical deposited on ITO (annealed at 400° C.) are shown in FIG. 17D. The switching time measurements were done at 633 nm for a fixed coloration/decoloration potential of −3 V and +3 V, respectively. The spectrum is recorded for the time the films take to reach an optical modulation ΔT 90%. The coloration time for WO$_3$ on PDA/ITO (annealed at 400° C.) sample is 33 seconds. The bleaching time is 74 seconds. The WO$_3$ electrochemical deposited on ITO (annealed at 400° C.) sample shows very low contrast, which might be caused by low porosity and large size WO$_3$ crystals formed during annealing. These results clearly demonstrate that the performance of WO$_3$ could be improved by using PDA spheres as sacrifice templates.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of preparing monodispersed polydopamine nano- or microspheres, the method comprising:
 a) providing a solvent system comprising water and at least one alcohol having the formula R—OH, wherein R is selected from the group consisting of optionally substituted $C_1$-$C_6$ alkyl, optionally substituted $C_2$-$C_6$ alkenyl, optionally substituted $C_2$-$C_6$ alkynyl, optionally substituted $C_3$-$C_6$ cycloalkyl, optionally substituted $C_3$-$C_6$ cycloalkenyl, and optionally substituted $C_6$-$C_7$ aryl;
 b) adding dopamine to said solvent system to form a reaction mixture; and c) agitating said reaction mixture for a time period of 1 to 10 days to form said monodispersed polydopamine nano- or microspheres.

2. The method according to claim 1, wherein the alcohol is a $C_1$-$C_6$ alkyl alcohol.

3. The method according to claim 1, wherein the alcohol is selected from the group consisting of ethanol, isopropyl alcohol, ethylene glycol, and mixtures thereof.

4. The method according to claim 1, wherein the volumetric ratio of water to alcohol in the solvent system is in the range of 20:1 to 3:2.

5. The method according to claim 1, wherein concentration of dopamine in the reaction mixture is in the range of 0.5 mg/ml to 2.0 mg/ml.

6. The method according to claim 1, wherein the solvent system further comprises tris(hydroxymethyl)amino methane buffer solution.

7. The method according to claim 1, wherein agitating is carried out at a temperature of 1° C. to 50° C.

* * * * *